United States Patent
Fujita et al.

(10) Patent No.: US 7,069,350 B2
(45) Date of Patent: Jun. 27, 2006

(54) DATA TRANSFER CONTROL SYSTEM, ELECTRONIC INSTRUMENT, AND DATA TRANSFER CONTROL METHOD

(75) Inventors: Shinichiro Fujita, Kitakyushu (JP); Hiroyuki Kanai, Shiojiri (JP); Akemi Ito, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 10/625,685

(22) Filed: Jul. 24, 2003

(65) Prior Publication Data

US 2004/0128405 A1 Jul. 1, 2004

(30) Foreign Application Priority Data

Aug. 5, 2002 (JP) .............................. 2002-227304

(51) Int. Cl.
*G06F 13/28* (2006.01)
(52) U.S. Cl. ..................... 710/22; 710/33; 710/35; 710/105
(58) Field of Classification Search .................. 710/22, 710/27, 33, 35, 104, 105, 110, 305, 306, 308, 710/313
See application file for complete search history.

(56) References Cited

U.S. PATENT DOCUMENTS

| | | | |
|---|---|---|---|
| 5,613,162 A * | 3/1997 | Kabenjian | 710/22 |
| 6,052,745 A * | 4/2000 | Miller et al. | 710/35 |
| 6,111,592 A * | 8/2000 | Yagi | 345/537 |
| 6,115,771 A | 9/2000 | Born | |
| 6,658,518 B1 * | 12/2003 | Domon | 710/305 |
| 2004/0034720 A1 | 2/2004 | Fujita et al. | |
| 2004/0167995 A1 | 8/2004 | Fujita et al. | |
| 2004/0167999 A1 | 8/2004 | Fujita et al. | |

FOREIGN PATENT DOCUMENTS

| | | |
|---|---|---|
| EP | 0 864 984 A2 | 9/1998 |
| EP | 0 953 486 A2 | 11/1999 |
| JP | 4-102951 | 4/1992 |
| JP | A-05-67013 | 3/1993 |
| JP | A-10-222441 | 8/1998 |

OTHER PUBLICATIONS

What is Direct Memory Access (DMA)?.*

* cited by examiner

*Primary Examiner*—Khanh Dang
(74) *Attorney, Agent, or Firm*—Oliff & Berridge, PLC

(57) ABSTRACT

A data transfer control system receives a command packet ORB (SBP-2) transferred through a bus BUS1 (IEEE1394), and issues a command included in the ORB to a device connected with a bus BUS2 (ATA (IDE)/ATAPI). The data transfer control system sets a sufficiently large fixed DMA data length irrespective of the type of the issued command, and instructs start of DMA transfer to or from the device connected with the bus BUS2. The data transfer control system aborts the DMA transfer when a device connected with BUS2 informs of completion of command processing. As the fixed DMA data length, a value greater than a storage capacity of a storage or a value greater than a data length which can be designated by a command is employed. The data transfer control system issues a command included in the ORB to a device connected with the bus BUS2 without decoding the command.

21 Claims, 18 Drawing Sheets

FIG. 5B  PAGE TABLE IS PRESENT

FIG. 5C  PAGE TABLE IS NOT PRESENT

PIO READ (STORAGE DEVICE → DATA TRANSFER CONTROL SYSTEM → PC)

PIO WRITE (PC → DATA TRANSFER CONTROL SYSTEM → STORAGE DEVICE)

DMA READ (STORAGE DEVICE → DATA TRANSFER CONTROL SYSTEM → PC)

DMA WRITE (PC → DATA TRANSFER CONTROL SYSTEM → STORAGE DEVICE)

UltraDMA READ (STORAGE DEVICE → DATA TRANSFER CONTROL SYSTEM → PC)

UltraDMA WRITE (PC → DATA TRANSFER CONTROL SYSTEM → STORAGE DEVICE)

DATA TRANSFER CONTROL SYSTEM, ELECTRONIC INSTRUMENT, AND DATA TRANSFER CONTROL METHOD

Japanese Patent Application No. 2002-227304 filed on Aug. 5, 2002, is hereby incorporated by reference in its entirety.

BACKGROUND OF THE INVENTION

The present invention relates to a data transfer control system, an electronic instrument, a program, and a data transfer control method.

An interface standard called IEEE1394 is widely used in a personal computer (hereinafter may be called "PC"). A protocol called Serial Bus Protocol-2 (SBP-2) is known as a higher layer protocol including a part of a function of a transaction layer of IEEE1394. In SBP-2 (SBP in a broad sense), a command set similar to that of SCSI (MMC-2) is used.

An interface standard called ATA (IDE)/ATAPI has been widely used for storage devices such as a CD drive, DVD drive, and hard disk drive.

Therefore, a data transfer control system having a bus bridge function between IEEE1394 and ATA/ATAPI is necessary for connecting a storage device having an ATA/ATAPI interface with a PC having an IEEE1394 interface.

This type of data transfer control system issues a SCSI (MMC-2) command transferred by using IEEE1394 SBP-2 to a storage device as an ATA/ATAPI command. The data transfer control system decodes the SCSI command, analyzes the contents of the SCSI command, and starts DMA transfer between the data transfer control system and the storage device.

However, since various types of commands are transferred by using SBP-2, decode (analysis) processing of such commands increases the processing load and processing time.

BRIEF SUMMARY OF THE INVENTION

One aspect of the present invention relates to a data transfer control system for transferring data through a bus, comprising:

a command processing section which receives a command packet transferred through a first bus and issues a command included in the command packet to a device connected with a second bus; and a Direct Memory Access (DMA) transfer instruction section which sets a fixed DMA data length irrespective of type of the issued command and instructs start of DMA transfer to or from the device connected with the second bus.

BRIEF DESCRIPTION OF THE SEVERAL VIEWS OF THE DRAWING

FIGS. 5A to 5C are illustrative views of a page table.

DETAILED DESCRIPTION OF THE EMBODIMENT

Embodiments of the present invention are described below.

Note that the embodiments described below do not limit the scope of the invention defined by the claims laid out herein. Similarly, the overall configuration of the embodiments below should not be taken as limiting the subject matter defined by the present invention.

1. IEEE1394 and SBP-2

1.1 Layer Structure

A protocol called Serial Bus Protocol-2 (SBP-2) has been proposed as a higher layer protocol including a part of a function of a transaction layer of IEEE1394. SBP-2 (SBP in a broad sense) has been proposed to enable a command set of SCSI (MMC-2) to be utilized on the protocol of IEEE1394. SBP-2 enables the command set which has been used in an electronic instrument conforming to the SCSI standard to be used in an electronic instrument conforming to the IEEE1394 standard merely by adding minimum changes to the command set. Therefore, the design and development of an electronic instrument can be facilitated.

Figure 1:
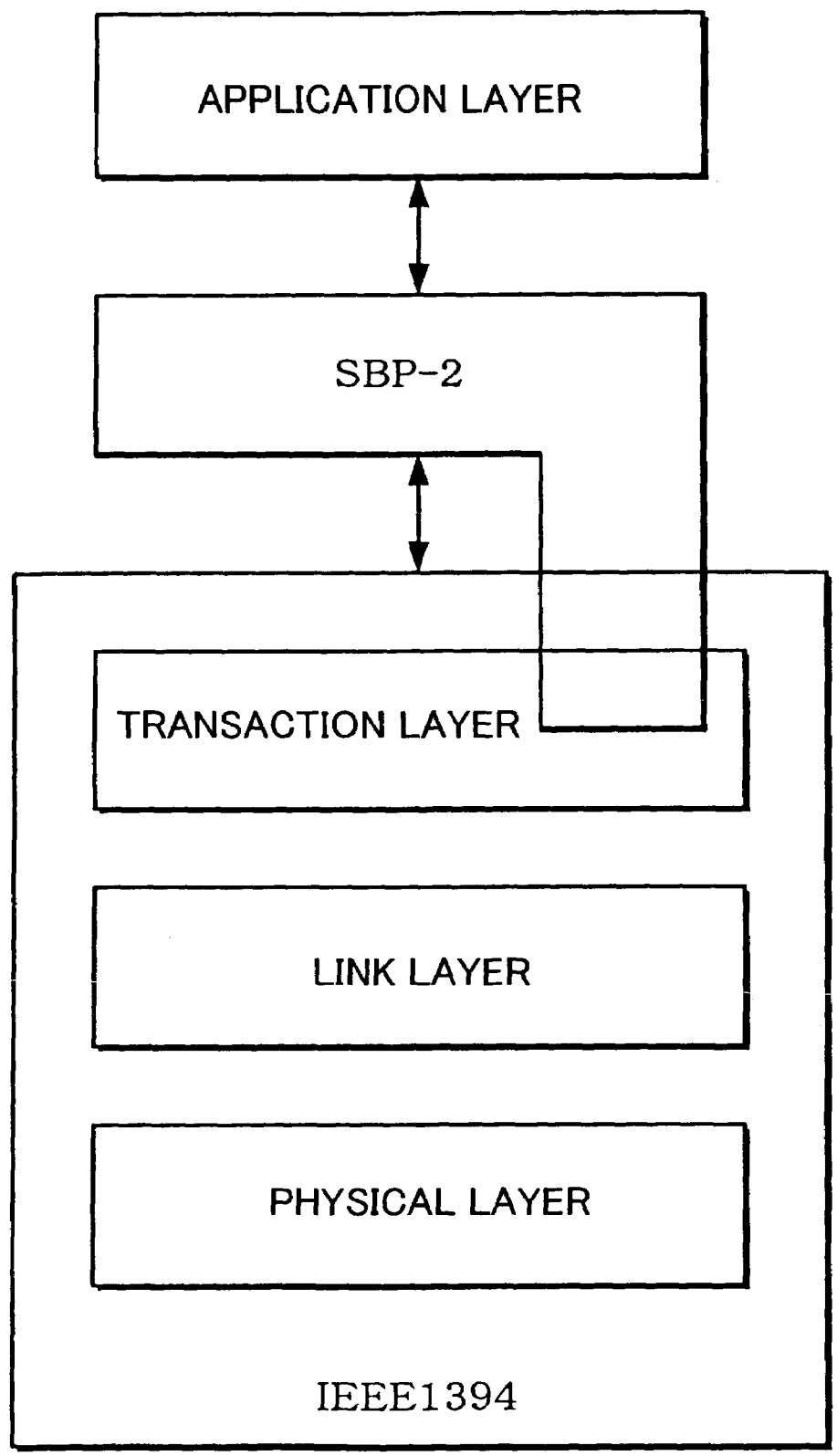
FIG. 1 is an illustrative view of a layer structure of IEEE1394 and SBP-2.

FIG. 1 schematically shows a layer structure (protocol stack) of IEEE1394 and SBP-2.

The protocols of IEEE1394 (IEEE1394-1995, P1394a, P1394b, etc.) include a transaction layer, a link layer, and a physical layer.

The transaction layer provides an upper layer with an interface (service) in a transaction unit, and performs transactions such as a read transaction, write transaction, and lock transaction through an interface provided by the link layer in a lower layer.

In the read transaction, data is transferred to a requester node from a responder node. In the write transaction, data is transferred to the responder node from the requester node. In the lock transaction, data is transferred to the responder node from the requester node, and the responder node processes the data and returns the processed data to the requester node.

The link layer provides addressing, data checking, data framing for packet transmission and reception, cycle control for isochronous transfer, and the like.

The physical layer translates logical symbols used by the link layer into electrical signals, arbitrates for the bus, and provides a physical bus interface.

As shown in FIG. 1, an SBP-2 layer provides a higher layer protocol including a part of the function of the transaction layer of IEEE1394 (first interface standard in a broad sense).

1.2 Processing of SBP-2

Figure 2:
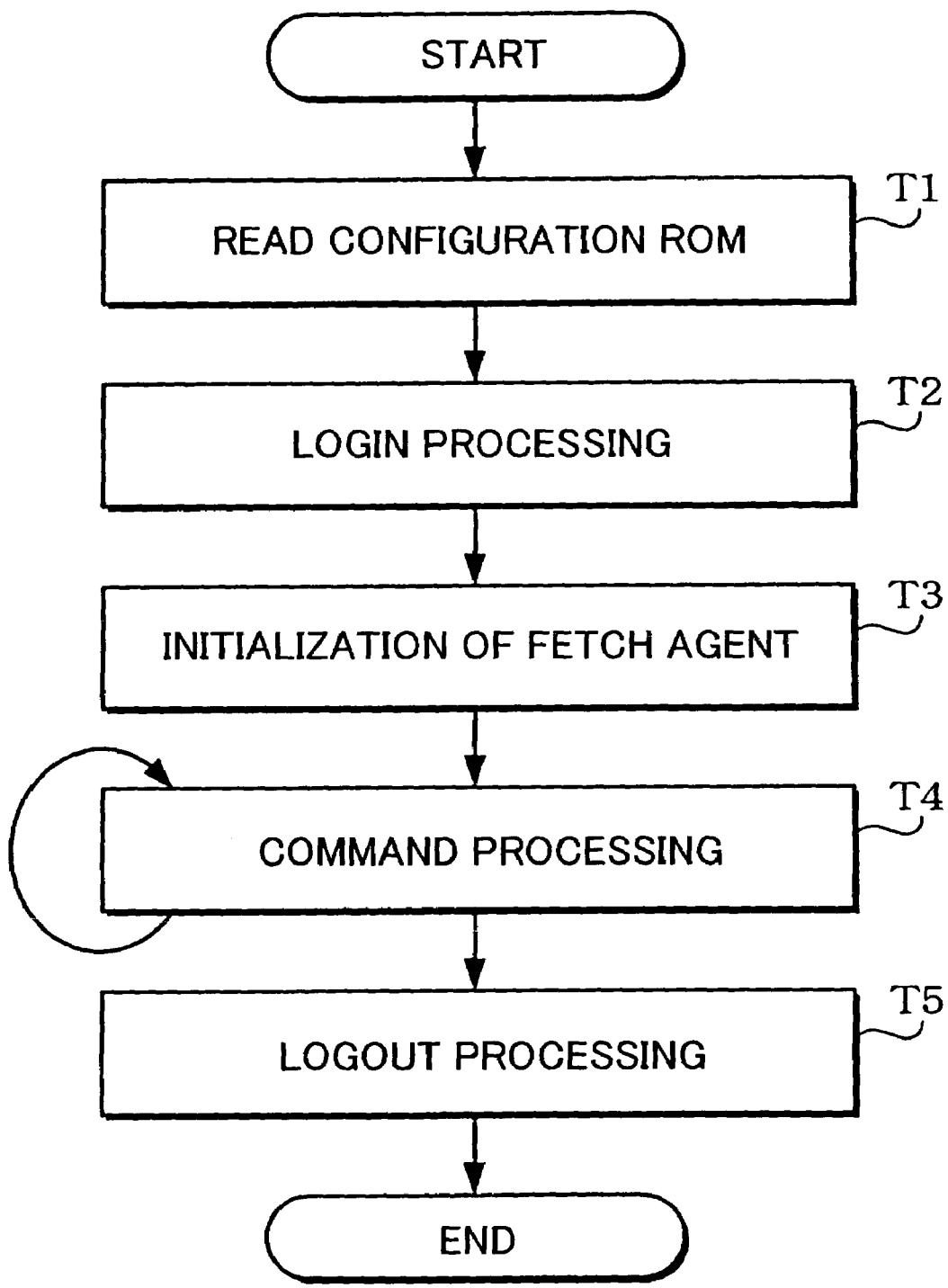
FIG. 2 is an illustrative view of an outline of processing of SBP-2.

FIG. 2 shows a flowchart of the entire processing of SBP-2 (first higher layer protocol of the first interface standard in a broad sense).

In SBP-2, read processing of a configuration ROM is performed for confirming connected equipment as shown in FIG. 2 (step T1).

Login processing for allowing an initiator (personal computer, for example) to acquire an access right to a target (storage device, for example) (request initiation permission; right to use the bus) is performed (step T2). In more detail, the login processing is performed by using a login operation request block (ORB) created by the initiator.

A fetch agent is initialized (step T3). Command processing is performed by using a command block ORB (normal command ORB) (step T4), and logout processing is performed by using a logout ORB. (step T5).

Figure 3:
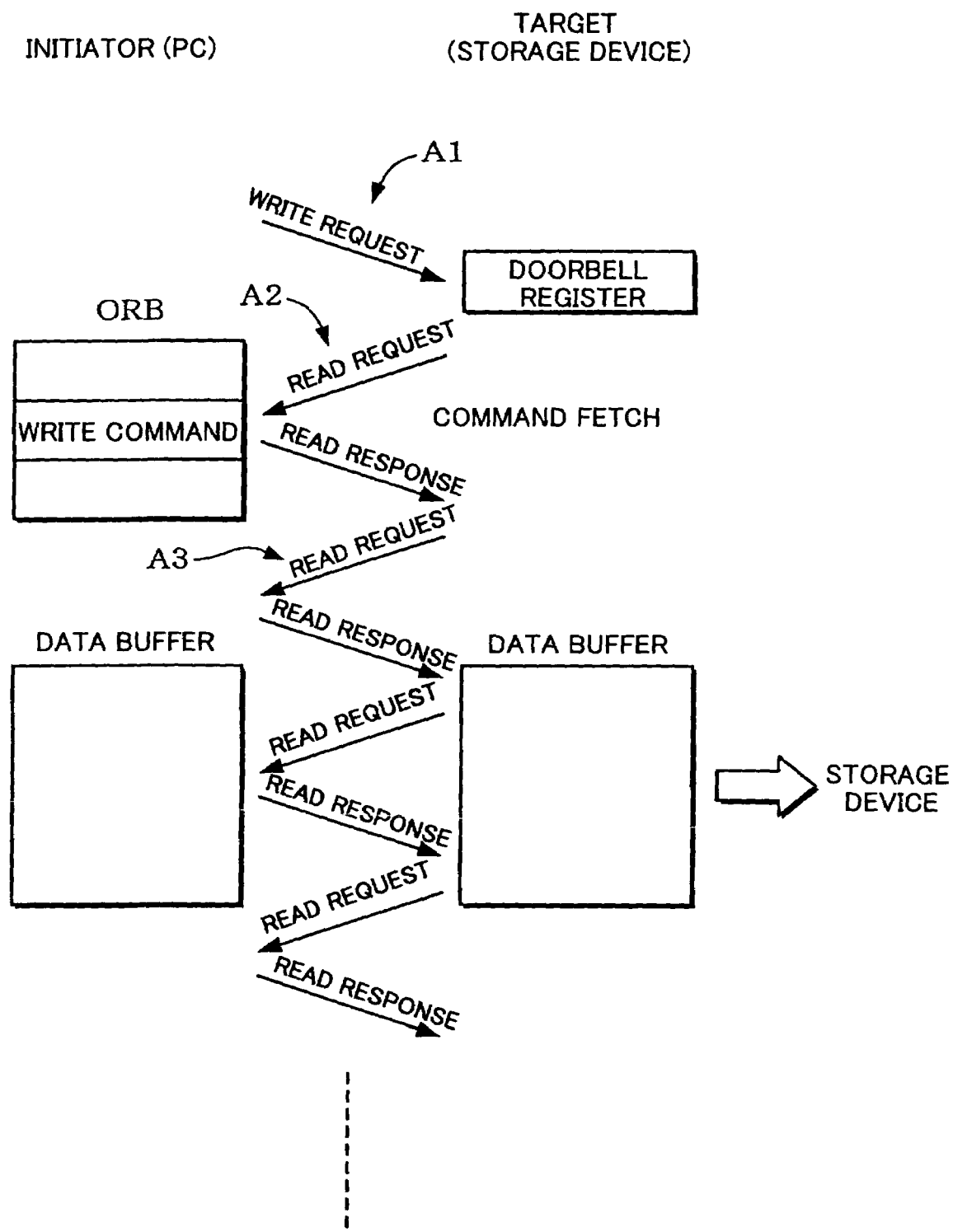
FIG. 3 is an illustrative view of command processing in SBP-2 in the case of transferring data from an initiator to a target.

In the command processing in the step T4, the initiator transfers a write request packet (issues a write request transaction) to ring a doorbell register of the target, as indicated by A1 in FIG. 3. The target transfers a read request packet, and the initiator returns a read response packet corresponding to the read request packet, as indicated by A2. This allows the ORB (command block ORB) created by the initiator to be fetched in a data buffer (packet buffer) of the target. The target analyzes a command included in the ORB fetched in the data buffer.

If the command included in the ORB is a SCSI write command, the target transfers a read request packet to the initiator, and the initiator returns a read response packet corresponding to the read request packet, as indicated by A3. This allows data stored in a data buffer of the initiator to be transferred to the target. In the case where the target is a storage device, the transferred data is written in the storage device.

Figure 4:
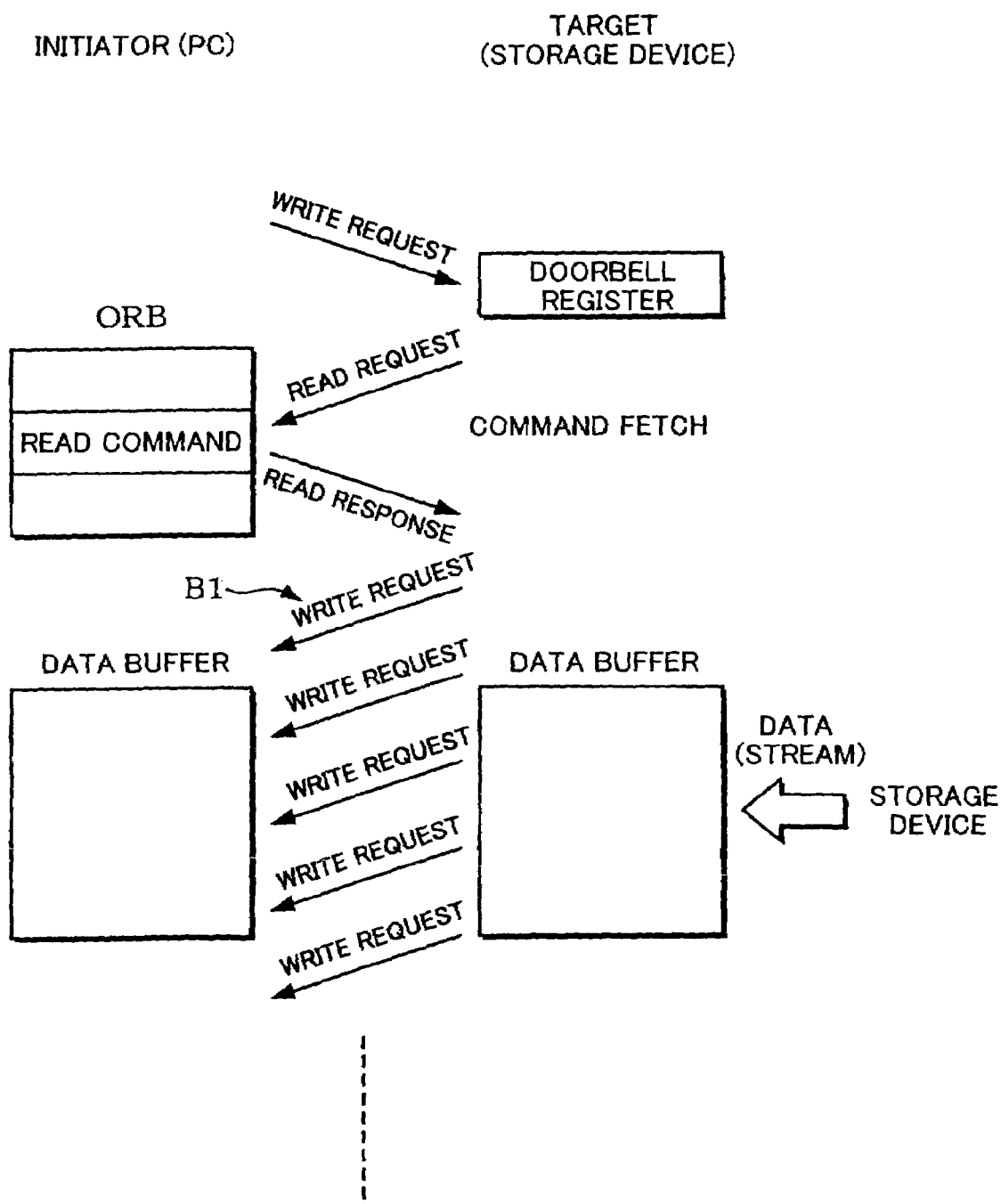
FIG. 4 is an illustrative view of command processing in SBP-2 in the case of transferring data from a target to an initiator.

If the command included in ORB is a SCSI read command, the target transfers a series of write request packets to the initiator, as indicated by B1 in FIG. 4. In the case where the target is a storage device, data read from the storage device is transferred to the data buffer of the initiator.

According to SBP-2, the target can transmit or receive data by transferring a request packet (issuing a transaction) at its convenience. Therefore, since it is unnecessary for the initiator and the target to operate in synchronization, data transfer efficiency can be increased.

As a higher layer protocol of IEEE1394, an AV/C command which is suitable for transferring image and sound data has been proposed in addition to SBP-2 which is suitable for transferring data of a storage device or a printer. As a protocol for transferring internet protocol (IP) packets on the IEEE1394 bus, a protocol called IPover1394 has also been proposed.

Figure 5A:
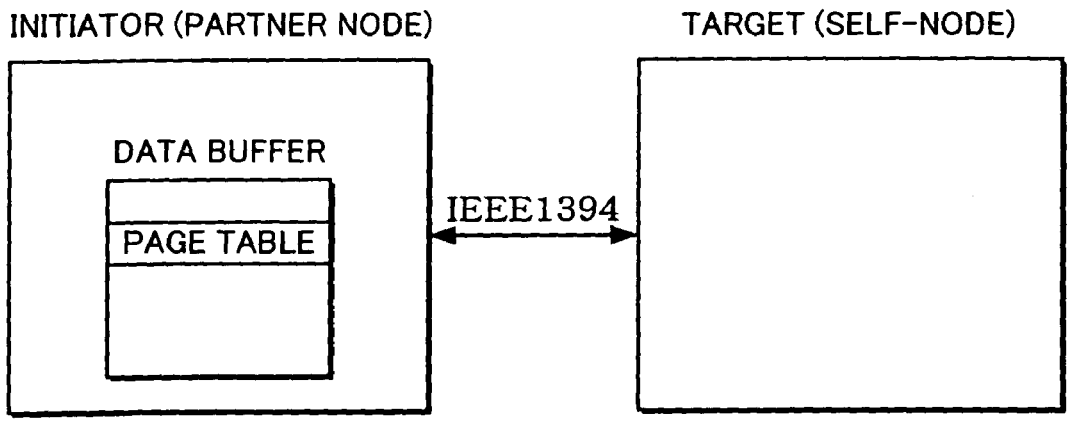
Figure 5A:
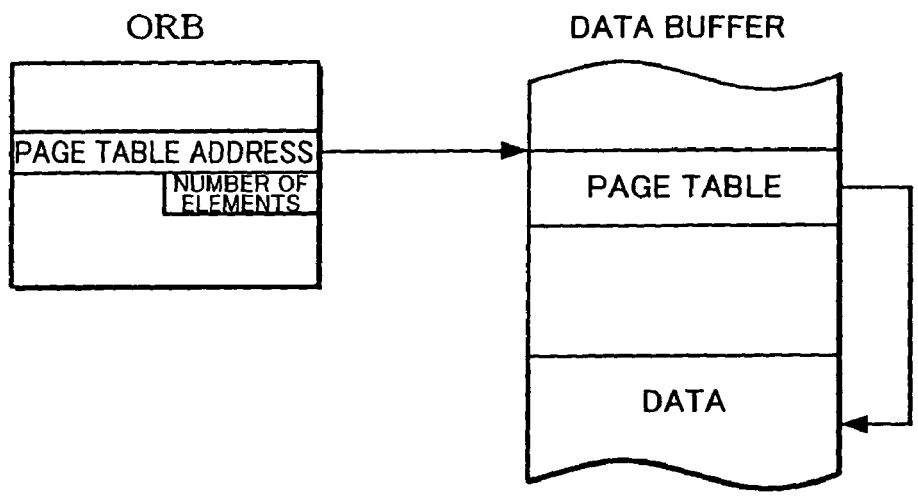
Figure 5A:
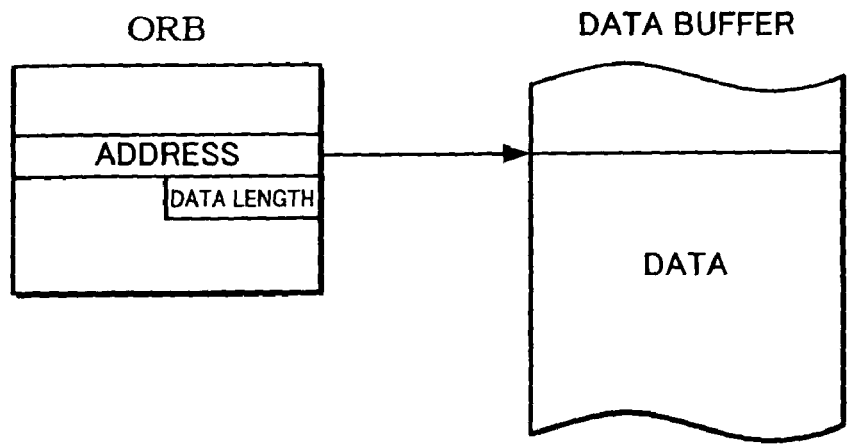

In the case of transferring data between the target and the initiator, there may be a case where a page table is present in the data buffer of the initiator (personal computer or partner node) as shown in FIG. 5A, and a case where a page table is not present in the data buffer of the initiator.

In the case where a page table is present, the page table address and the number of elements are included in the ORB created by the initiator, as shown in FIG. 5B. The address (read address or write address) of data to be transferred is indirectly addressed by using the page table.

In the case where a page table is not present, an address and data length are included in the ORB and data to be transferred is directly addressed, as shown in FIG. 5C.

1.3 Bus Bridge Function

Figure 6A:
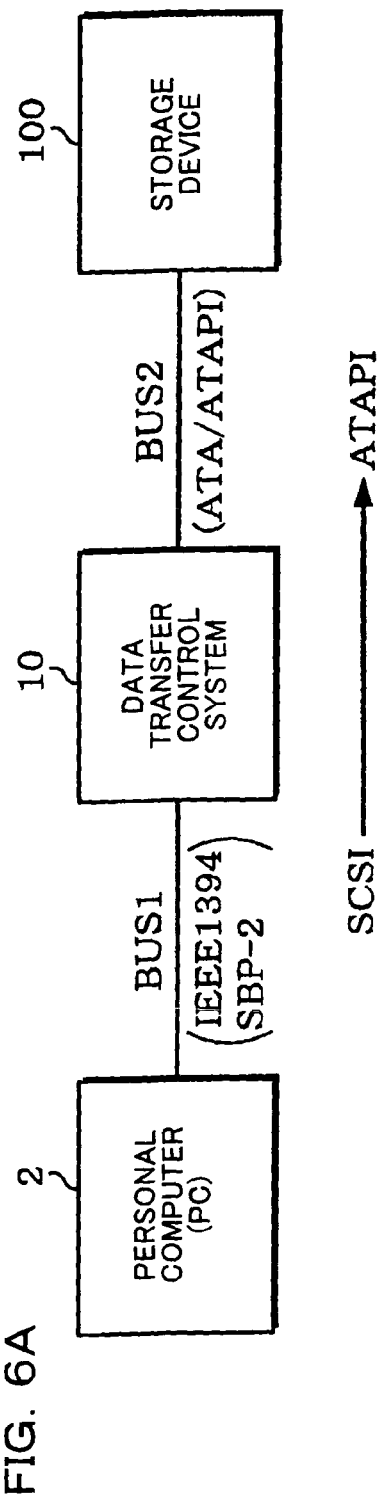
FIGS. 6A and 6B are illustrative views of a bus bridge function of a data transfer control system and relations between various commands.

As shown in FIG. 6A, a data transfer control system 10 in the present embodiment has a bus bridge function between a bus BUS1 (first bus) conforming to IEEE1394 (SBP-2) and a bus BUS2 (second bus) conforming to ATA (IDE)/ATAPI. ATA (AT Attachment) is widely used as an interface standard mainly for hard disk drives. ATAPI (ATA Packet Interface) is an interface standard which enables ATA to be used in optical disk drives such as CD drives.

The data transfer control system 10 capable of realizing the bus bridge function shown in FIG. 6A issues a SCSI (SPC-2) command included in an ORB (command packet in a broad sense) transferred from a personal computer 2 to a storage device 100 (optical disk drive) as an ATAPI command. The data transfer control system 10 decodes the SCSI command transferred by using SBP-2, analyses the contents of the SCSI command, and starts DMA transfer between the data transfer control system 10 and the storage device 100.

However, since various types of commands are transferred through the SBP-2 bus, the processing load and processing time are increased if such commands are decoded and analyzed.

Figure 6B:
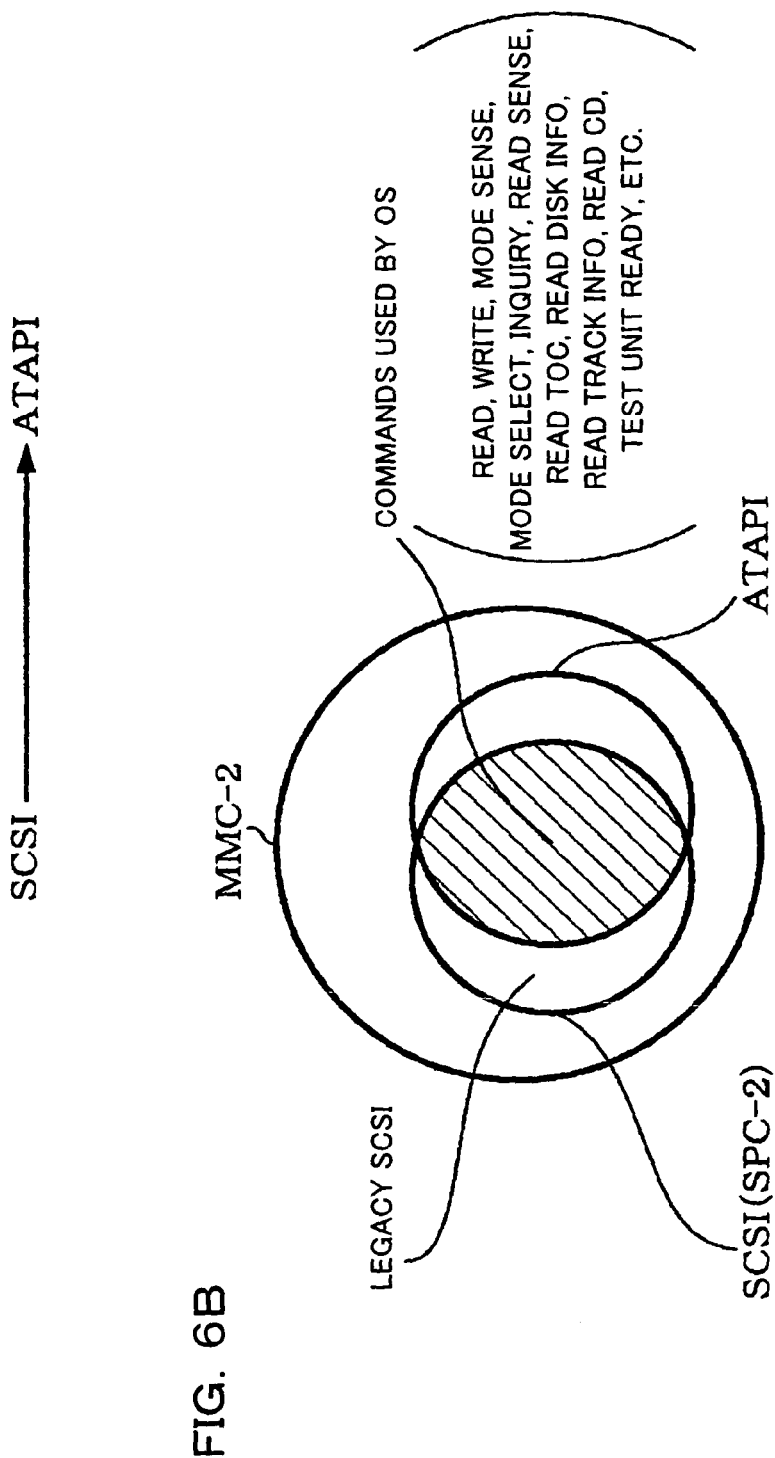

As shown in FIG. 6B, only commands common to SCSI (Small Computer System Interface) and ATAPI (AT Attachment Packet Interface) are used in operating systems (OS) manufactured by Apple Computer, Inc., Microsoft Corporation, and the like which operate on the personal computer 2.

The present embodiment employs a data transfer control system having a configuration described below taking the above problems into consideration.

2. Entire Configuration

Figure 7:
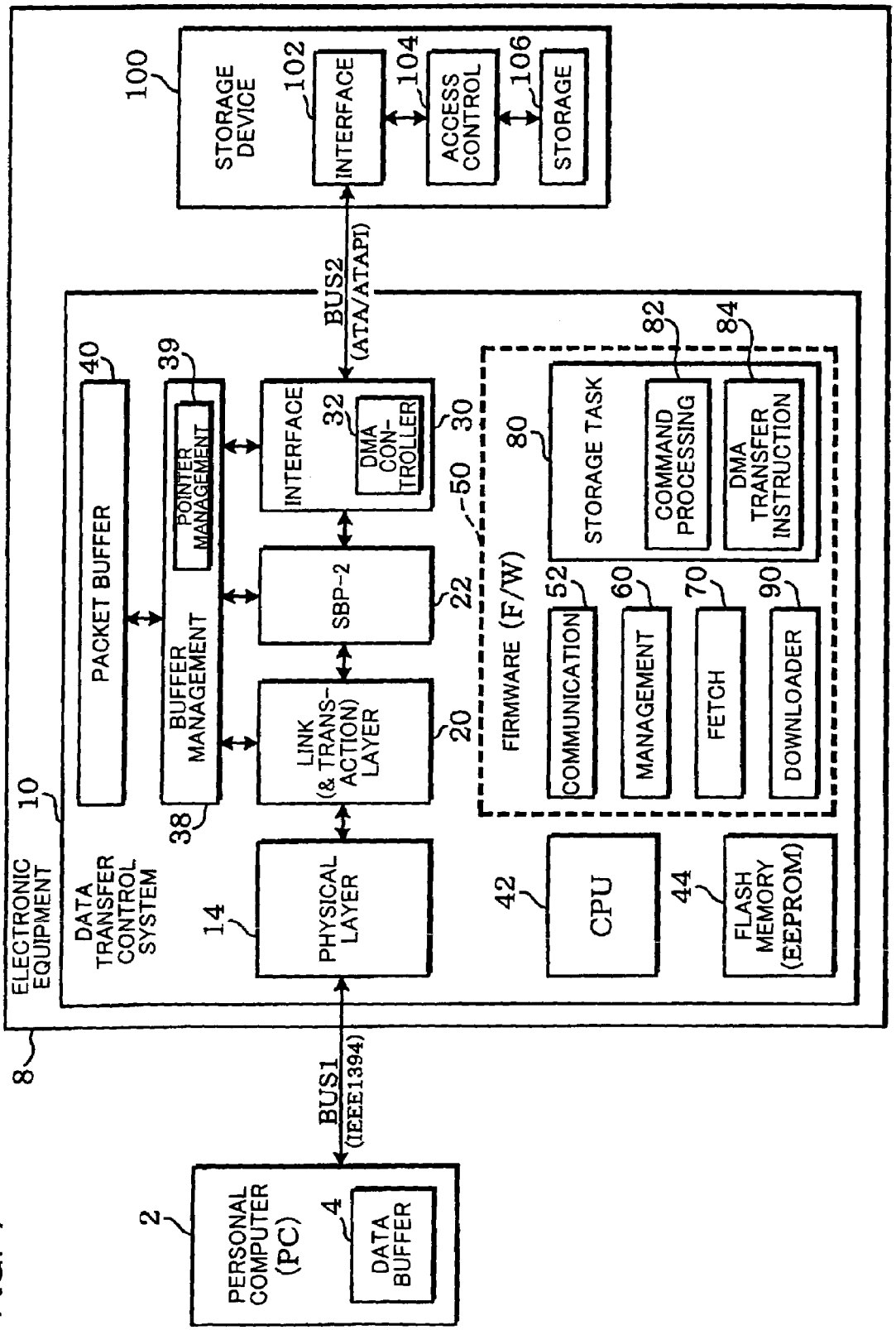
FIG. 7 is a view showing a configuration example of a data transfer control system and an electronic instrument in an embodiment of the present invention.

FIG. 7 shows an entire configuration example of a data transfer control system in the present embodiment and an electronic instrument including the data transfer control system. The following description is given taking a case where a target which performs data transfer between the initiator and the target is a storage device (CD drive, DVD drive, or the like) as an example. However, the present invention is not limited thereto.

The personal computer (host computer) 2 including a data buffer 4 is connected with an electronic instrument 8 through the bus BUS1 (first bus) conforming to IEEE1394. The electronic instrument 8 includes the data transfer control system 10 and the storage device 100 (device in a broad sense).

The electronic instrument 8 may include a system CPU, a system memory (ROM and RAM), an operating section, a signal processing device, and the like (not shown).

The data transfer control system 10 includes a physical layer (PHY) circuit 14, a link layer circuit 20, an SBP-2 circuit 22, an interface circuit 30, a packet management circuit 38, and a packet buffer 40 (data buffer). The data transfer control system 10 includes a CPU 42 and a flash memory 44 (EEPROM). The data transfer control system 10 includes firmware 50 of which processing modules (program) are stored in the flash memory 44 and which is executed by the CPU 42 (processor in a broad sense). The data transfer control system 10 in the present embodiment does not necessarily include all the circuit blocks and functional blocks shown in FIG. 7. Some of the circuit blocks and functional blocks may be omitted.

The physical layer circuit 14 is a circuit for realizing the protocol of the physical layer shown in FIG. 1 by the hardware. The physical layer circuit 14 has a function of translating logical symbols used by the link layer circuit 20 into electrical signals.

The link (& transaction) layer circuit 20 is a circuit for realizing a part of the protocols of the link layer and the transaction layer shown in FIG. 1 by the hardware. The link layer circuit 20 provides various services for packet transfer between the nodes.

Data transfer conforming to IEEE1394 can be performed between the data transfer control system 10 and the personal computer 2 (an electronic instrument in a broad sense) through the bus BUS1 (first bus) by utilizing the functions of the physical layer circuit 14 and the link layer circuit 20.

The SBP-2 circuit 22 (transfer execution circuit) is a circuit which realizes a part of the SBP-2 protocol and a part of the transaction layer by the hardware. The function of the SBP-2 circuit 22 enables processing for dividing transfer data into a series of packets and continuously transferring the divided series of packets to be realized.

The interface circuit 30 is a circuit which performs interface processing between the data transfer control system 10 and the storage device 100. Data transfer conforming to ATA (AT Attachment) and ATAPI (ATA Packet Interface) can be performed between the data transfer control system 10 and the storage device 100 through the bus BUS2 (second bus) by the function of the interface circuit 30.

The data transfer control system 10 can be provided with a bus bridge function between IEEE1394 (first interface standard in a broad sense) and ATA (IDE)/ATAPI (second interface standard in a broad sense) by providing the physical layer circuit 14, the link layer circuit 20, and the interface circuit 30 as shown in FIG. 7.

A DMA controller 32 included in the interface circuit 30 is a circuit for performing direct memory access (DMA) transfer between the data transfer control system 10 and the storage device 100 through the bus BUS2.

The storage device 100 connected with the bus BUS2 includes an interface circuit 102 for performing data transfer conforming to ATA (IDE)/ATAPI, and an access control circuit 104 which controls access (write or read) to a storage 106 such as an optical disk or hard disk.

The buffer management circuit 38 is a circuit which manages an interface between the packet buffer 40 and the link layer circuit 20 and the like. The buffer management circuit 38 includes registers for controlling the buffer management circuit 38, an arbitration circuit which arbitrates for bus connection to the packet buffer 40, a sequencer which generates various control signals, and the like.

The buffer management circuit 38 includes a pointer management section 39. The pointer management section manages pointers of the packet buffer 40 by using a ring buffer method, and updates a plurality of pointers for writing and reading.

The packet buffer 40 (packet memory or data buffer) is a buffer for temporarily storing packets (transferred data), and is formed by hardware such as an SRAM, SDRAM, or DRAM. In the present embodiment, the packet buffer 40 functions as a randomly accessible packet storage section.

The packet buffer 40 may not be included in the data transfer control system 10 and be provided externally.

The CPU 42 (processor in a broad sense) controls the entire device and data transfer.

The flash memory 44 (EEPROM) is an electrically erasable programmable nonvolatile memory. The processing modules (program) of the firmware 50 are stored in the flash memory 44.

The firmware 50 is a program which includes various processing modules (processing routines) and operates on the CPU 42. The protocols of the transaction layer and the like are realized by the firmware 50 and the hardware such as the CPU 42.

The firmware 50 (F/W) includes a communication section 52, a management section 60, a fetch section 70, a storage task section 80, and a downloader section 90. The firmware 50 does not necessarily include all of these functional blocks (modules). Some of the functional blocks may be omitted.

The communication section 52 is a processing module which functions as an interface between the firmware 50 and the hardware such as the physical layer circuit 14 and the link layer circuit 20.

The management section 60 (management agent) is a processing module which manages a login, reconnect, logout, reset, and the like. In the case where the initiator requests a login to the target, the management section 60 receives the login request.

The fetch section 70 (fetch agent) is a processing module which receives an operation request block (ORB), issues a status, and requests the storage task section 80 to perform command processing. The fetch section 70 can also handle a link list of an ORB fetched by the fetch section 70 in response to a request from the initiator, differing from the management section 60 which can handle only a single request.

The storage task section 80 is a processing module for processing a command included in an ORB and processing DMA transfer.

The downloader section 90 is a processing module for updating the processing module of the firmware 50 stored in the flash memory 44 and the like.

The storage task section 80 includes a command processing section 82 and a DMA transfer instruction section 84.

The command processing section 82 performs various types of processing of an ORB (command packet or a command packet for data transfer operation request in a broad sense) transferred through the bus BUS1 (first bus conforming to the first interface standard such as EEE1394). In more detail, the command processing section 82 receives an ORB from the bus BUS1, and issues a command (SCSI or MMC-2 command) included in the ORB to the storage device 100 (device in a broad sense) connected with the bus BUS2 (second bus conforming to the second interface standard such as ATA/ATAPI). In this case, the command processing section 82 issues the command retrieved from the ORB (command packet) to the storage device 100 without decoding the command (decode processing for checking the data count, the number of sectors, or parameters designated in the command), specifically, without analyzing the contents of the command.

The DMA transfer instruction section 84 sets a fixed (predetermined) DMA data length, instructs start (initiation) of DMA transfer (data transfer without involving the CPU) through the bus BUS2, and the like.

In more detail, the DMA transfer instruction section 84 sets a fixed DMA data length (DMA data size) irrespective of the command (command included in the ORB) issued by the command processing section 82. Specifically, the DMA transfer instruction section 84 sets a fixed DMA data length in a given register (DMA data length setting register) of the interface circuit 30 even if the command is a read command or a read CD command, for example. The DMA transfer instruction section 84 instructs the interface circuit 30 (storage device 100) and the like to start DMA transfer for the DMA data length. In more detail, the DMA transfer instruction section 84 instructs issuance of a DMA transfer request acknowledge signal (DMACK) in response to a DMA transfer request signal (DMARQ) from the storage device 100 to start DMA transfer.

The DMA transfer instruction section 84 aborts the DMA transfer which has been started when the storage device 100 connected with the bus BUS2 notifies the data transfer control system 10 of completion of command processing by using a signal INTRQ (interrupt) or the like. In more detail, the DMA transfer instruction section 84 releases the interface circuit 30 (DMA controller 32) and the like from a DMA transfer transmission or reception state, and clears a DMA transfer counter to zero (initial value).

As the fixed DMA data length, a value greater than the storage capacity (670 Mbytes (CD) or 4.7 Gbytes (DVD), for example) of the storage 106 (medium in/from which transfer data is written/read by the storage device 100) may be employed. A value greater than a data length which can be designated by a command (SBP-2 or ATAPI) (maximum data length which can be indicated by the number of bits in the data length field of the packet) may also be employed. A maximum data length determined by limitations on the hardware, interface standard, and protocol may also be employed. The fixed DMA data length may be set in the register (D flip-flops or memory) or the like in advance, and need not be set each time DMA transfer is started.

3. Detail of Processing

Figure 8:
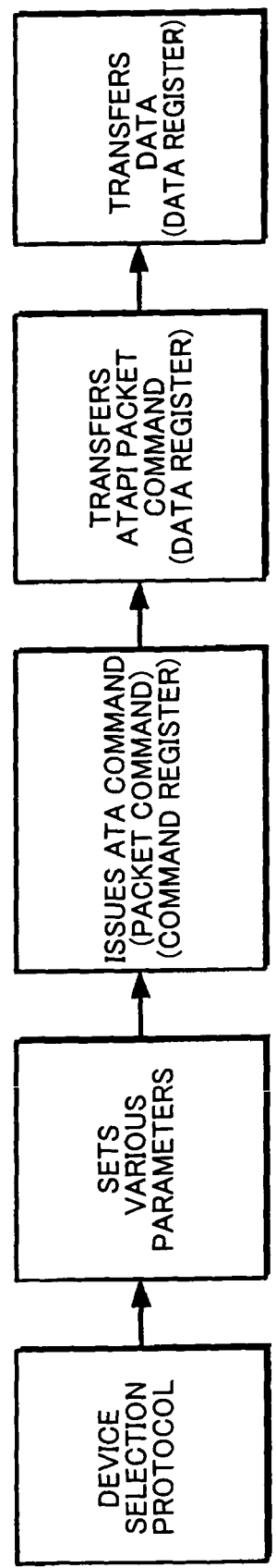
FIG. 8 is a view showing a flow of an outline of ATA Packet Interface (ATAPI) packet command processing.

FIG. 8 is a flowsheet showing an outline of ATAPI packet command processing.

ATAPI is an interface standard for controlling multimedia devices such as CD drives and DVD drives. An ATAPI packet command is located in an upper layer of an ATA command, and is issued by using the ATA command.

In ATA, a command is executed by setting parameters in an ATA register and writing the command in a command register. In ATAPI, only a PACKET command is written in the command register, and a device control command is transferred in the subsequent ATAPI packet command transfer. Data is transferred to a data register after the packet command transfer. This enables ATAPI to be realized by utilizing the ATA control system.

The data transfer control system 10 in the present embodiment realizes data transfer through the bus BUS2 by utilizing the ATAPI packet command.

Figure 9:
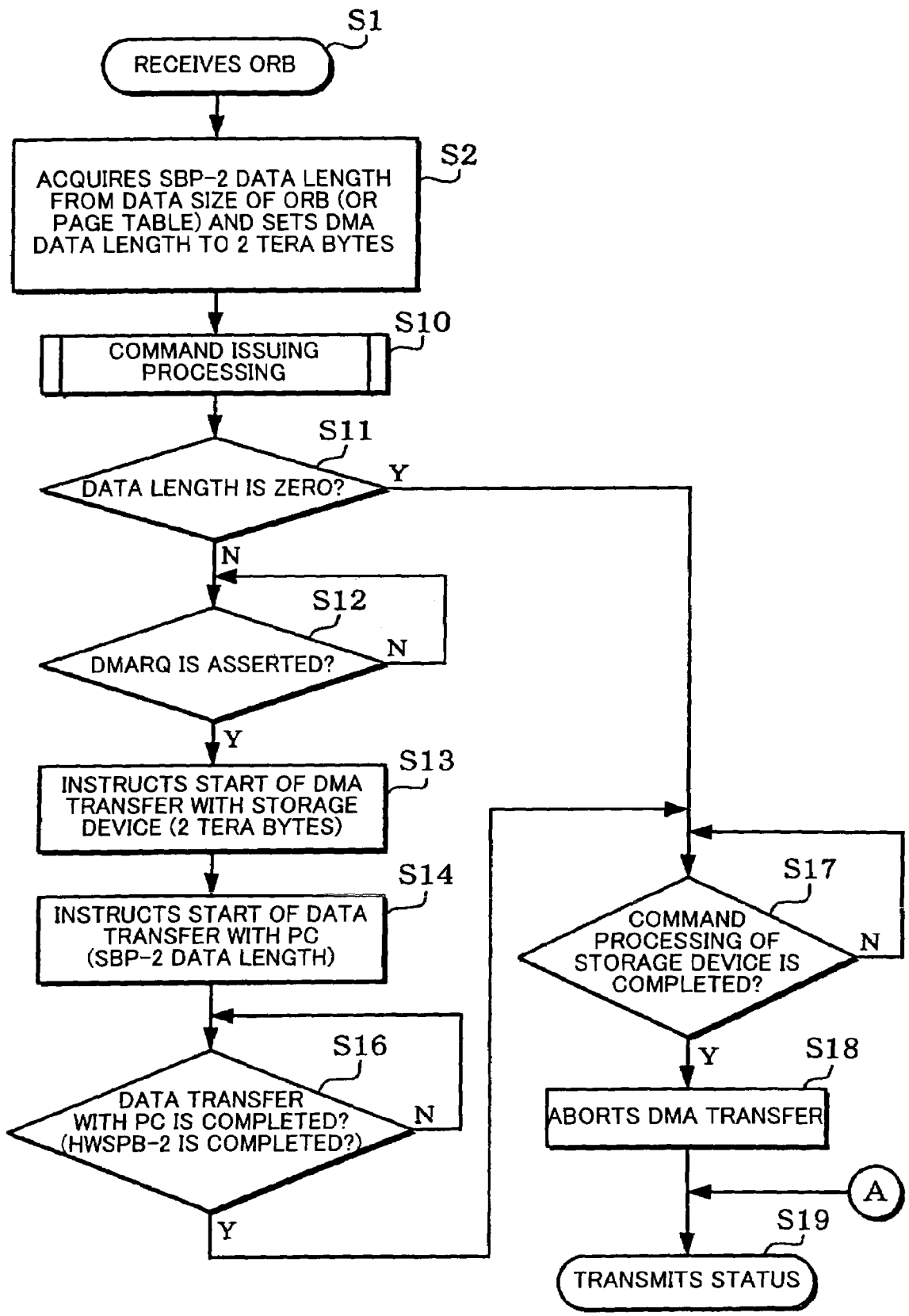
FIG. 9 is a flowchart showing a detailed processing example in an embodiment of the present invention.
Figure 10:
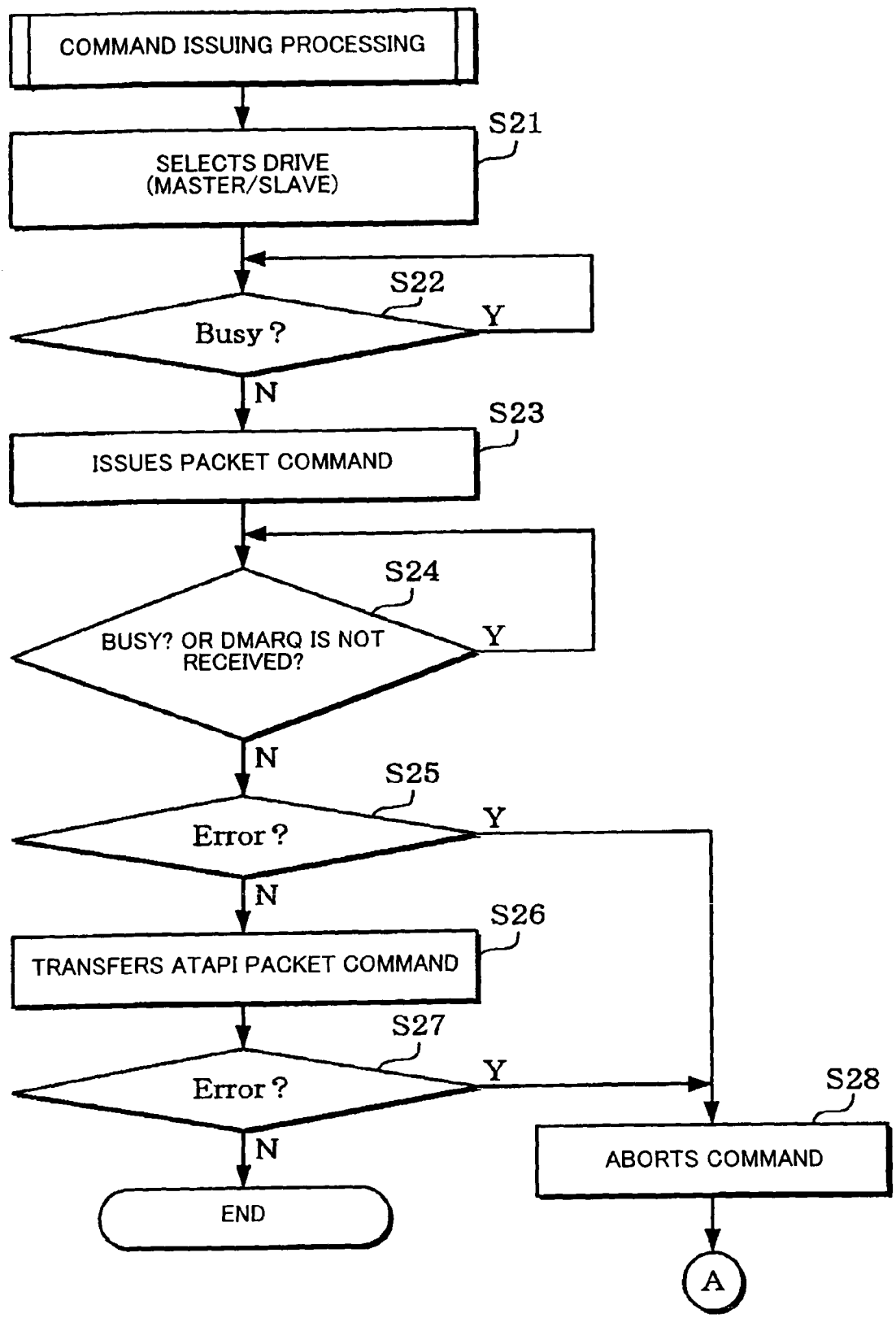
FIG. 10 is a flowchart showing a detailed processing example in an embodiment of the present invention.

FIGS. 9 and 10 show flowcharts of detailed processing in the present embodiment.

If the data transfer control system 10 receives an ORB during SBP-2 processing (step S1), the data transfer control system 10 acquires an SBP-2 data length from the data size of the ORB (or page table), and sets a DMA data length to 2 Tbytes (terabytes), for example (step S2).

Figure 11:
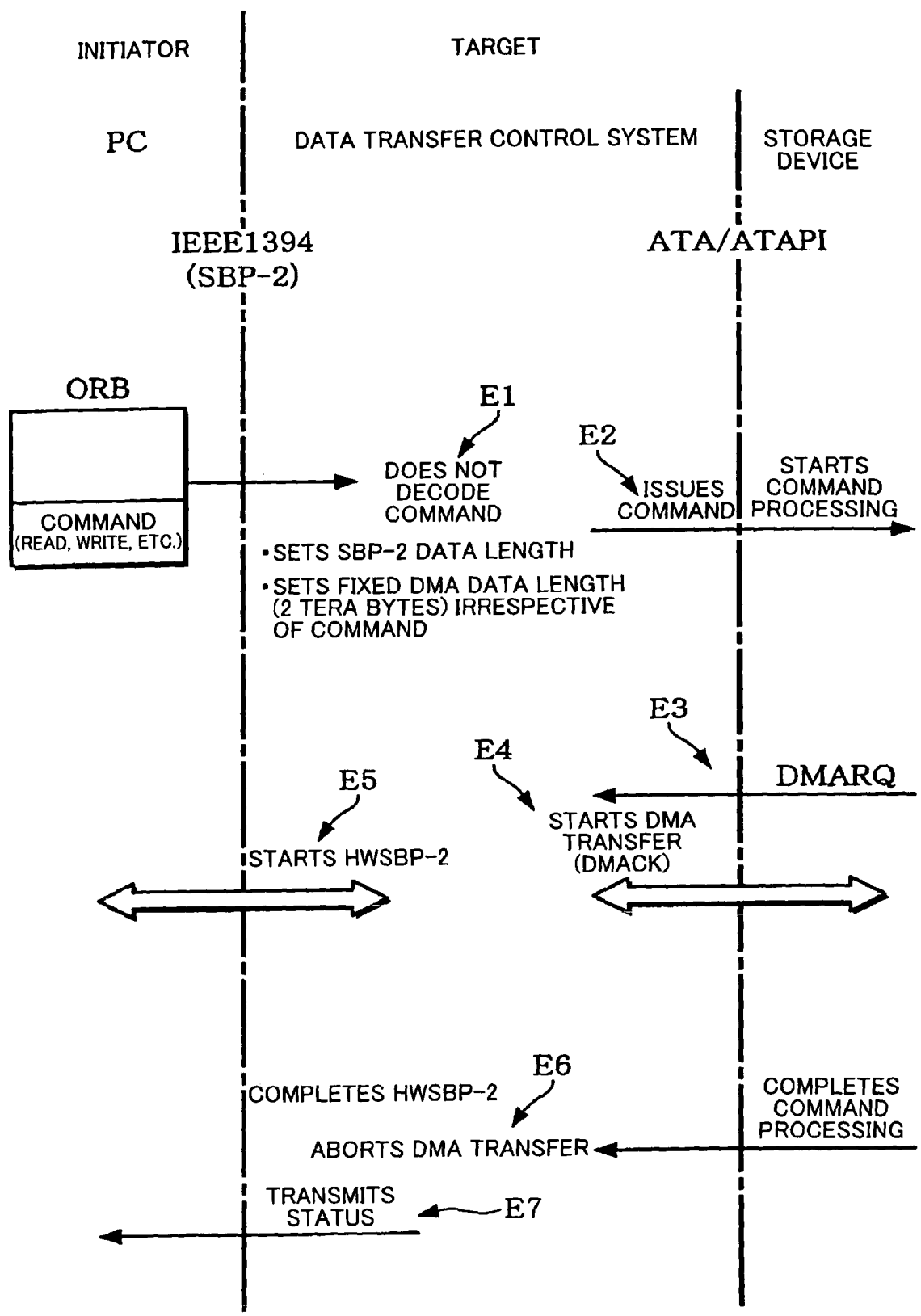
FIG. 11 is an illustrative view of a data transfer controlling in an embodiment of the present invention.

Specifically, the data transfer control system 10 does not perform decode processing (acquisition of the data count or the number of sectors, analysis of parameters, and the like) of the command (read command, write command, read CD command, or the like) included in the ORB, as indicated by E1 in FIG. 11. The data transfer control system 10 sets a fixed DMA data length (2 Tbytes) irrespective of the type of the command included in the ORB. The data transfer control system 10 issues the command included in the ORB to the storage device 100 through the bus BUS2, as indicated by E2 in FIG. 11 (step S10).

FIG. 10 shows a flowchart of command issuance processing in the step S10.

The data transfer control system 10 selects a drive (master/slave) (step S21). The data transfer control system 10 judges whether or not the storage device 100 is busy (step S22). If the storage device 100 is not busy, the data transfer control system 10 issues a PACKET command (step S23; see FIG. 8). The data transfer control system 10 then judges whether or not the storage device 100 is busy, or whether or not the signal DMARQ has been received from the storage device 100 (step S24). If the storage device 100 is not busy or the signal DMARQ has been received from the storage device 100, the data transfer control system 10 judges whether or not an error has occurred (step S25). If an error has occurred, the data transfer control system 10 aborts the command (step S28), and transitions to status transmission processing in step S19 in FIG. 9.

If an error has not occurred, the data transfer control system 10 transfers an ATAPI packet command (step S26; see FIG. 8). The data transfer control system 10 then judges whether or not an error has occurred (step S27). If an error has occurred, the data transfer control system 10 aborts the command (step S28), and transitions to the status transmission processing in the step S19 in FIG. 9. If an error has not occurred, the data transfer control system 10 completes the command issuance processing normally.

The processing shown in FIG. 9 is described below. After the command issuance processing has been completed, the data transfer control system 10 judges whether or not the data length is zero (step S11). If the command included in the ORB is a test unit ready command or a start/stop unit command, the data length is zero. If the data length is zero, the data transfer control system 10 transitions to step S17.

If the data length is not zero, the data transfer control system 10 judges whether or not the storage device 100 has asserted the signal DMARQ (DMA transfer request signal), as indicated by E3 in FIG. 11 (step S12). If the signal DMARQ has been asserted, the data transfer control system 10 instructs start of 2 Tbytes of DMA transfer between the data transfer control system 10 and the storage device 100, as indicated by E4 in FIG. 11 (step S13).

Specifically, signals such as the DMA transfer request signal DMARQ and the DMARQ acknowledge signal DMACK are defined for the bus BUS2 conforming to ATA/ATAPI as described later. If the interface circuit 102 of the storage device 100 asserts the signal DMARQ and the interface circuit 30 of the data transfer control system 10 then asserts the signal DMACK, DMA transfer is started.

The data transfer control system 10 then instructs start of data transfer for the SBP-2 data length between the data transfer control system 10 and the PC (personal computer 2), as indicated by E5 in FIG. 11 (step S14).

In the present embodiment, data transfer between the data transfer control system 10 and the PC is realized by using the SBP-2 circuit 22 (hardware circuit). This enables data (write data) received from the PC through the bus BUS1 to be automatically transferred to the storage device 100 through the packet buffer 40 and the bus BUS2 after setting the SBP-2 data length and the DMA data length. This also enables data (read data) received from the storage device 100 through the bus BUS2 to be automatically transferred to the PC through the packet buffer 40 and the bus BUS1. Therefore, it is unnecessary for the firmware 50 (CPU 42) to take part in data transfer processing until the SBP-2 transfer through the bus BUS1 and the ATAPI DMA transfer through the bus BUS2, are completed. This significantly reduces the processing load of the firmware 50.

Figure 13:
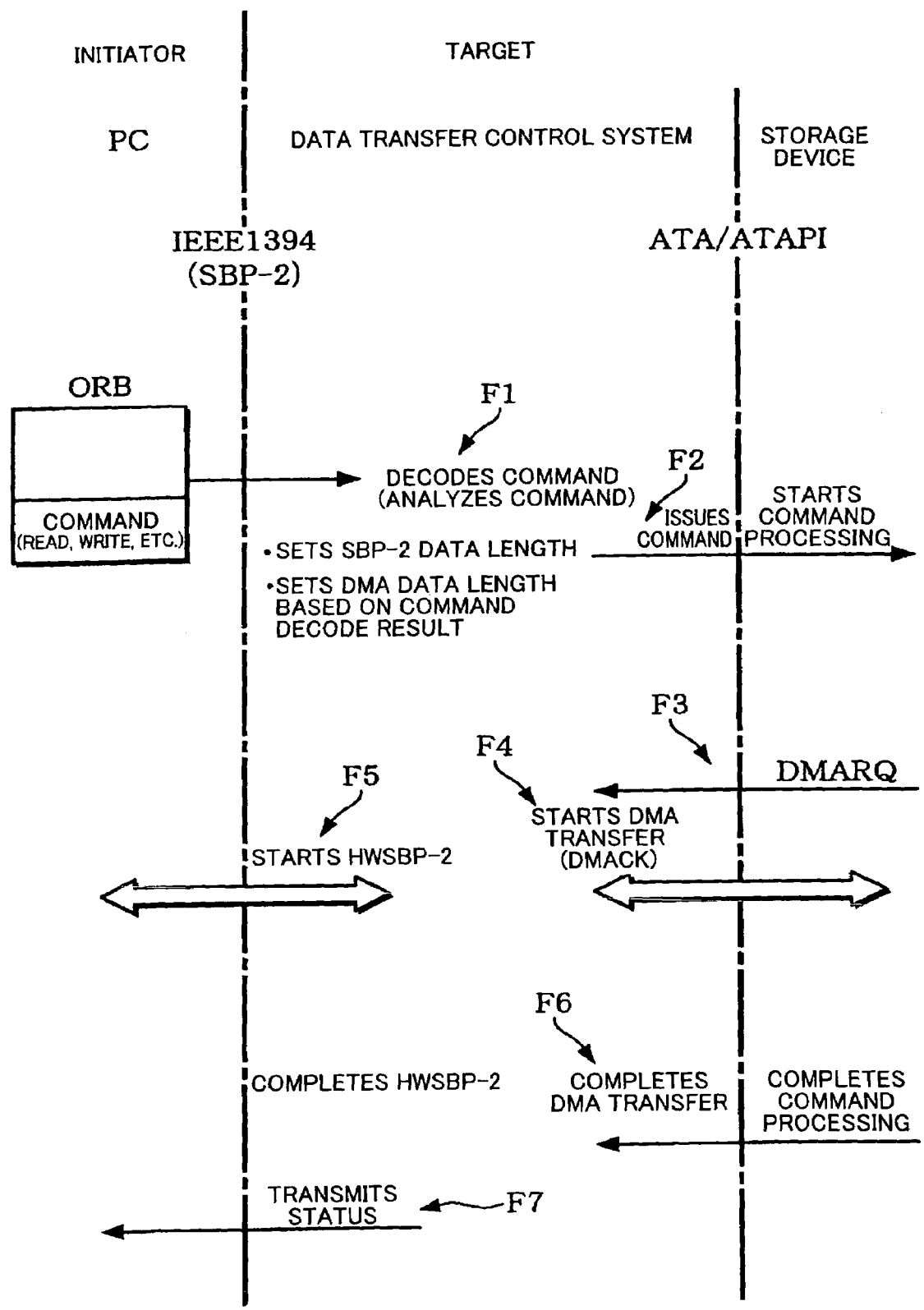
FIG. 13 is an illustrative view of a data transfer controlling in a comparative example.

If the data transfer control system 10 judges that the data transfer (hardware SBP-2 transfer) between the data transfer control system 10 and the PC has been completed (step S16), the data transfer control system 10 judges whether or not the command processing of the storage device 100 has been completed (step S17). The judgment is made by using the interrupt signal INTRQ defined in ATA/ATAPI or the like. If the data transfer control system 10 judges that the command processing has been completed, the data transfer control system 10 aborts the DMA transfer, as indicated by E6 in FIG. 13 (step S18). The data transfer control system 10 then transmits the status to the PC as indicated by E7 (step S19).

In the present embodiment, a sufficiently great value (2 Tbytes) is set as the DMA data length as indicated by the step S2 in FIG. 9. Therefore, the DMA transfer is not completed because the DMA data length does not become zero. Therefore, the DMA transfer is aborted on condition that the command processing is finished (DMA transfer is considered to be completed), as indicated by the step S17.

In more detail, since the DMA data length does not become zero even if the data transfer through the bus BUS2 is substantially completed, the data transfer control system 10 is in a DMA transfer transmission or reception wait state. If the storage device 100 notifies the data transfer control system 10 of completion of the command processing in this state by asserting the interrupt signal INTRQ, the data transfer control system 10 in the present embodiment releases the DMA transfer transmission or reception wait state and aborts the DMA transfer. This enables the DMA transfer to be completed normally.

In the present embodiment, since a sufficiently great DMA data length is set, the SCSI command included in the ORB transferred from the bus BUS1 can be issued to the storage device 100 through the bus BUS2 without analyzing the contents of the SCSI command. Therefore, decode processing of the command can be omitted, whereby the processing load can be significantly reduced. Moreover, even if the DMA transfer is started after setting a sufficiently great DMA data length, the DMA transfer can be completed normally by aborting the DMA transfer after the storage device 100 advised of completion of the command processing.

In SCSI, a control byte is added to the end of a command differing from ATAPI. SCSI uses 6-byte, 10-byte, and 12-byte commands, and ATAPI uses only 12-byte commands. A command block in an ORB is 12 bytes. A command of less than 12 bytes is padded, and a control byte is not added to the command. Therefore, no problem occurs even if a SCSI (MMC-2) command included in an ORB is issued to the ATAPI storage device 100. In the present embodiment, a command included in an ORB may be issued to the storage device 100 after adding some changes to the command.

Figure 12:
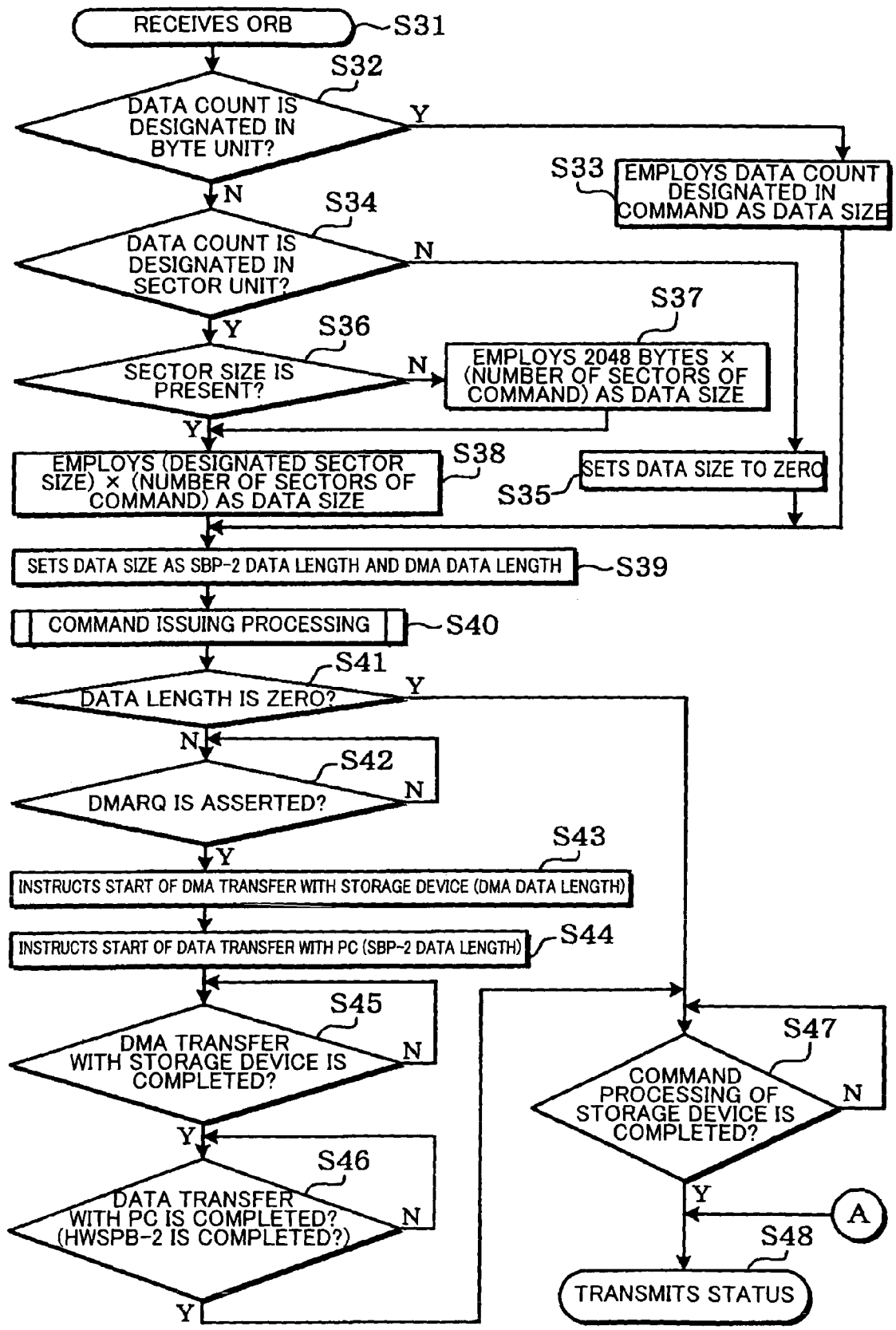
FIG. 12 is a flowchart showing a processing example in a comparative example.

FIG. 12 shows a flowchart of a data transfer control method in a comparative example of the present embodiment. In the comparative example shown in FIG. 12, the DMA data length is acquired by decoding a command included in an ORB.

Commands which should be decoded may be classified as follows, for example.

As examples of commands for transmitting or receiving data, a mode sense command, a mode select command, and an inquiry command which designate the data length by the number of bytes, a read command and a write command which designate the data length by the number of sectors, and the like can be given.

As examples of commands which do not transmit or receive data, a test unit ready command, a start/stop unit command, and the like can be given.

In the case of designating the data length by the number of sectors, it is necessary to designate the sector length in order to calculate the actual data length. In this case, the sector length may be designated by using the following methods.

(1) Designation of Sector Length by Mode Select Command (Legacy SCSI Specification)

The sector length is designated by a parameter of a mode select command. If the storage device (CD drive) normally completes the mode select command, the sector length designated in the mode select command is used as the subsequent sector length.

(2) Designation of Sector Length by Read CD Command

In the case where the sector length is designated by a parameter of a read CD command, the sector length is effective only for one command.

In the comparative example, processing shown in FIG. 12 is necessary for dealing with such various commands.

In FIG. 12, if the data transfer control system receives an ORB (step S31), the data transfer control system decodes a command included in the ORB and judges whether or not the data count is designated in a byte unit (step S32). If the data count is designated in a byte unit, the data transfer control system employs the data count designated in the command as the data size (step S33). If the data count is not designated in a byte unit, the data transfer control system judges whether or not the data count is designated in a sector unit (step S34). If the data count is not designated in a sector unit, the data transfer control system sets the data size to zero (step S35).

If the data count is designated in a sector unit, the data transfer control system judges whether or not the sector size is present (step S36). If the sector size is not present, the data transfer control system employs 2048 bytes×(number of sectors in command) as the data size (step S37). If the sector size is present, the data transfer control system employs (designated sector size)×(number of sectors in command) as the data size (step S38).

In the comparative example shown in FIG. 12, the data transfer control system sets the data size obtained by the above processing as the SBP-2 data length and the DMA data length (step S39). The data transfer control system then performs processing in steps S40 to S48. In the processing in the steps S40 to S48, the data transfer control system judges whether or not the DMA transfer has been completed based on the DMA data length and the like in the step S45 (see F6 in FIG. 13), differing from the processing in the present embodiment shown in FIG. 9. The abort processing of the DMA transfer in the step S118 in FIG. 9 is not present in FIG. 12.

In the comparative example shown in FIG. 12, since the command decode (analysis) processing is performed in the steps S32 to S38 (see F1 in FIG. 13), the processing load is increased. On the other hand, since the command decode processing is unnecessary in the present embodiment shown in FIG. 9, the present embodiment is more advantageous from this point of view.

Figure 14:
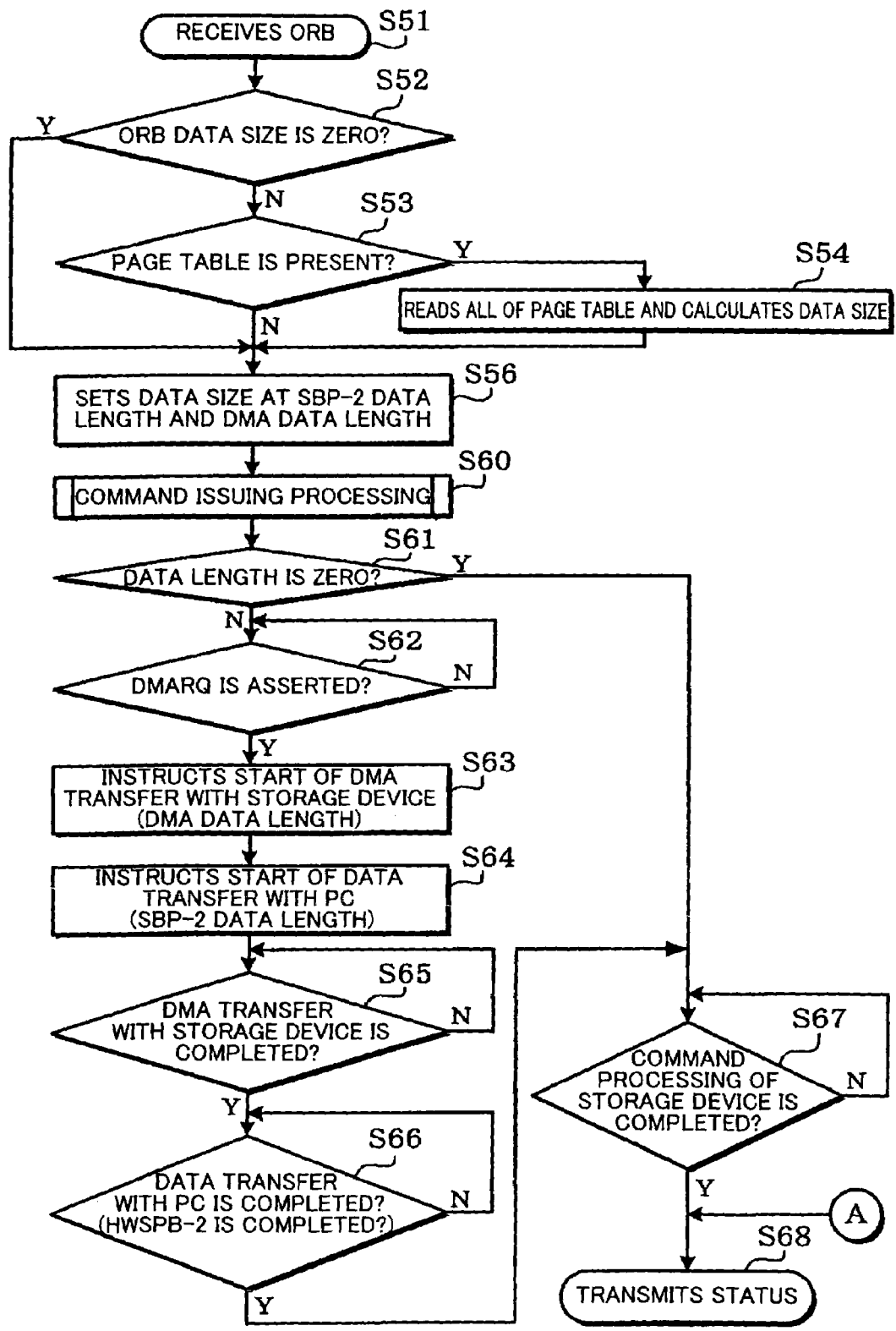
FIG. 14 is a flowchart showing a processing example in another comparative example.

FIG. 14 is a flowchart showing processing of a data transfer control method in another comparative example. In the comparative example shown in FIG. 14, the DMA data length is acquired by referring to a page table of an ORB and the like.

In FIG. 14, if the data transfer control system receives an ORB (step S51), the data transfer control system judges whether or not the data size in the ORB is zero (step S52). If the data size in the ORB is zero, the data transfer control system transitions to step S56. If the data size in the ORB is not zero, the data transfer control system judges whether or not a page table is present in the data buffer of the PC (step S53). If a page table is present, the data transfer control system reads all of the page table and calculates the data size (step S54). The data transfer control system then sets the calculated data size as the SBP-2 data length and the DMA data length (step S56). The subsequent processing in steps S60 to S68 is the same as the processing in the steps S40 to S48 in FIG. 12.

In the comparative example shown in FIG. 14, since the processing in the steps S52 to S54 is necessary, the processing load is increased. Therefore, the present embodiment shown in FIG. 9 is more advantageous from this point of view.

4. ATA/ATAPI Interface Circuit

Figure 15:
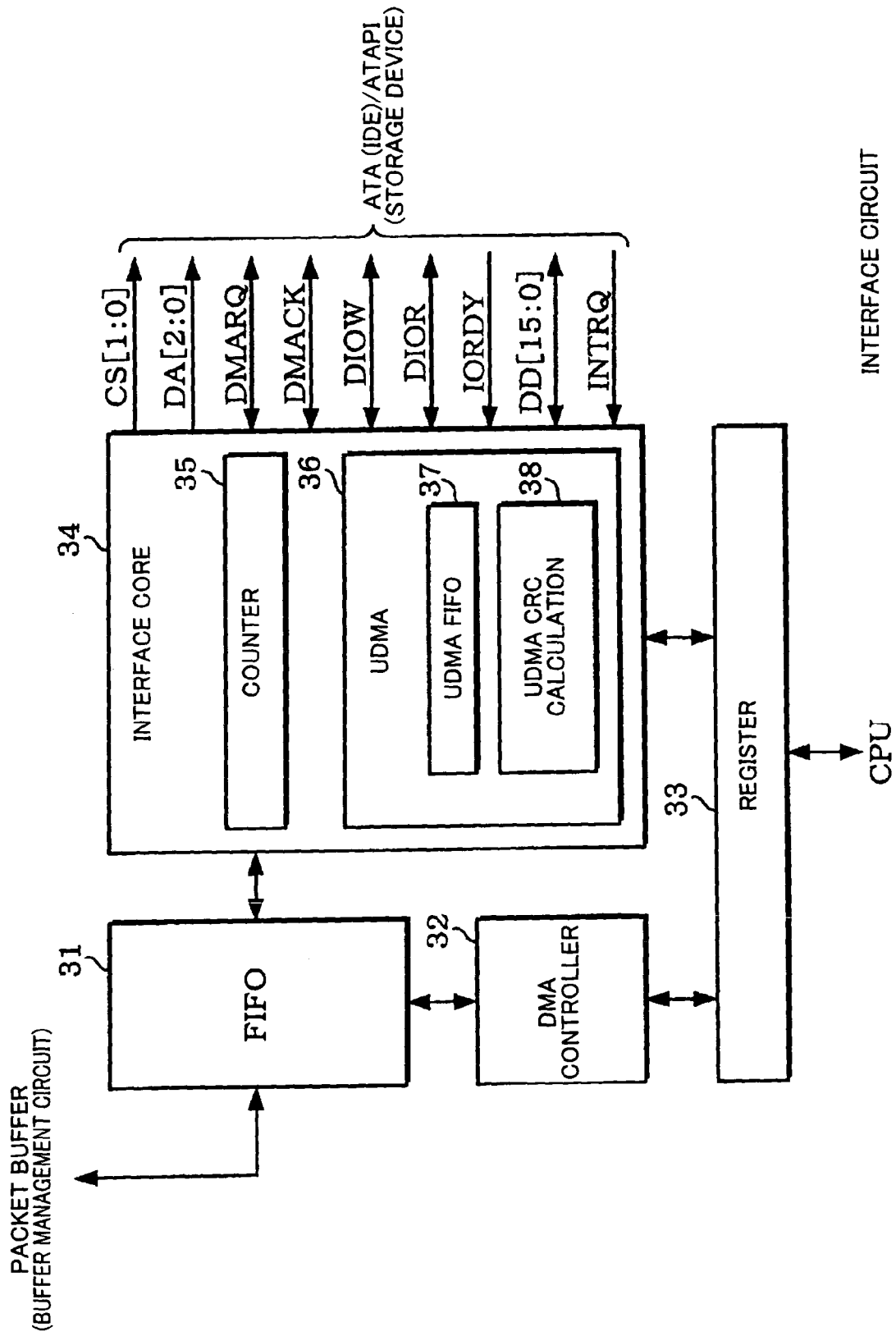
FIG. 15 is a view showing a configuration example of an AT Attachment (ATA)/ATAPI interface circuit.

FIG. 15 shows a configuration example of the ATA/ATAPI interface circuit 30. The interface circuit 30 does not necessarily include all the circuit blocks shown in FIG. 15. Some of the circuit blocks may be omitted.

A FIFO 31 is a buffer for adjusting (buffering) the difference in data transfer rate. The DMA controller 32 is a circuit which controls (REQ/ACK control) the FIFO 31 and an interface core circuit 34.

The interface core circuit 34 is a circuit which controls DMA transfer and the like. A counter 35 included in the interface core circuit 34 is an ATA (IDE)/ATAPI reset counter. A UDMA circuit 36 included in the interface core circuit 34 is a circuit for controlling ATA/ATAPI UltraDMA transfer. The UDMA circuit 36 includes an UltraDMA FIFO 37 and an UltraDMA CRC calculation circuit 38.

A register 33 is a register for controlling start of DMA transfer and the like. The register 33 is accessible by the firmware 50 (CPU 42).

A signal CS[1:0] is a chip select signal used to access each ATA register. A signal DA[2:0] is an address signal for accessing data or a data port.

The signals DMARQ and DMACK are signals used for DMA transfer. The storage device 100 (device) asserts (activates) the signal DMARQ when preparations for data transfer are completed, and the data transfer control system 10 (host) asserts the signal DMACK when initiating the DMA transfer in response to the signal DMARQ.

A signal DIOW (STOP) is a write signal used to write data in a register or a data port. The signal DIOW functions as a STOP signal during UltraDMA transfer. A signal DIOR (HDMARDY, HSTROBE) is a read signal used to read data from a register or a data port. The signal DIOR functions as an HDMARDY/HSTROBE signal during UltraDMA transfer.

A signal IORDY (DDMARDY, DSTROBE) is used as a wait signal when the storage device 100 does not complete preparations for data transfer and the like. The signal IORDY functions as a DDMARDY/DSTROBE signal during UltraDMA transfer.

The signal INTRQ is a signal used for the storage device 100 (device) to request an interrupt to the data transfer control system 10 (host). If the data transfer control system 10 reads the contents of the status register of the storage device 100 after the signal INTRQ is asserted, the storage device 100 negates (deactivates) the signal INTRQ after a given period has elapsed. The storage device 100 can notify the data transfer control system 10 of the completion of the command processing by using the signal INTRQ.

FIGS. 16A to 18B show signal waveform examples of the above ATA signals. In FIGS. 16A to 18B, "#" indicates that the signal is a negative logic signal (asserted at L level).

Figure 16A:
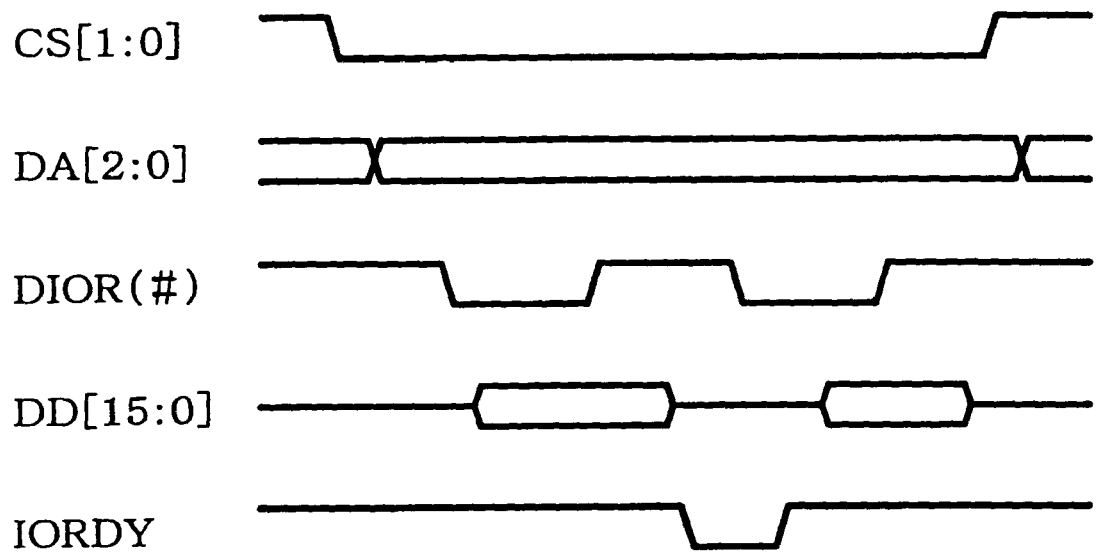
FIGS. 16A and 16B are views showing signal waveform examples during PIO reading and PIO writing.
Figure 16B:
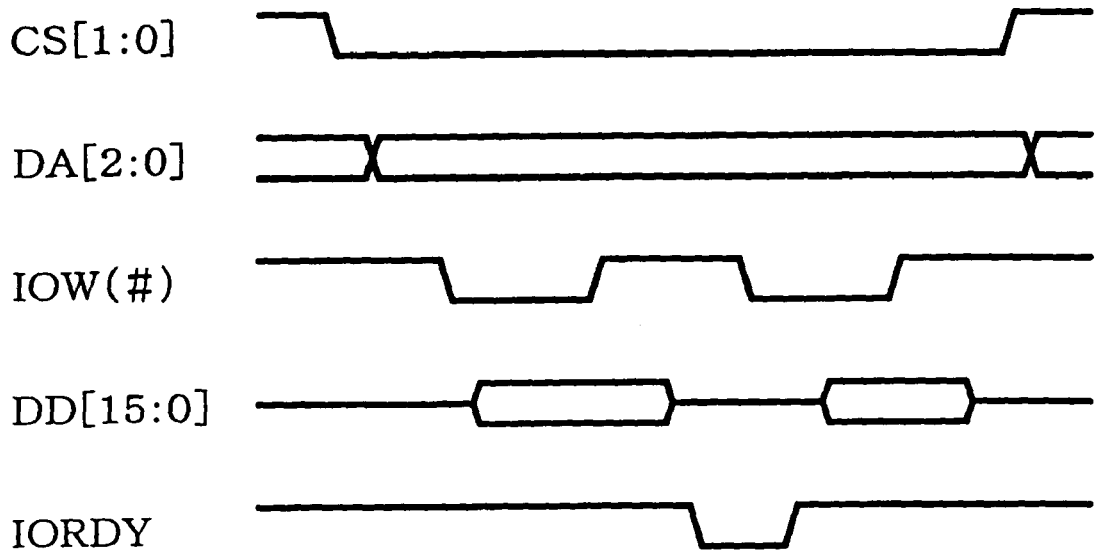

FIGS. 16A and 16B are signal waveform examples during PIO (Parallel I/O) reading and PIO writing. The ATA status register is read by the PIO reading shown in FIG. 16A. The control register is written by the PIO writing shown in FIG. 16B. For example, issuance of the PACKET command and transfer of the ATAPI packet command to the storage device 100 (see FIGS. 8 and 10) may be performed by the PIO transfer.

Figure 17A:
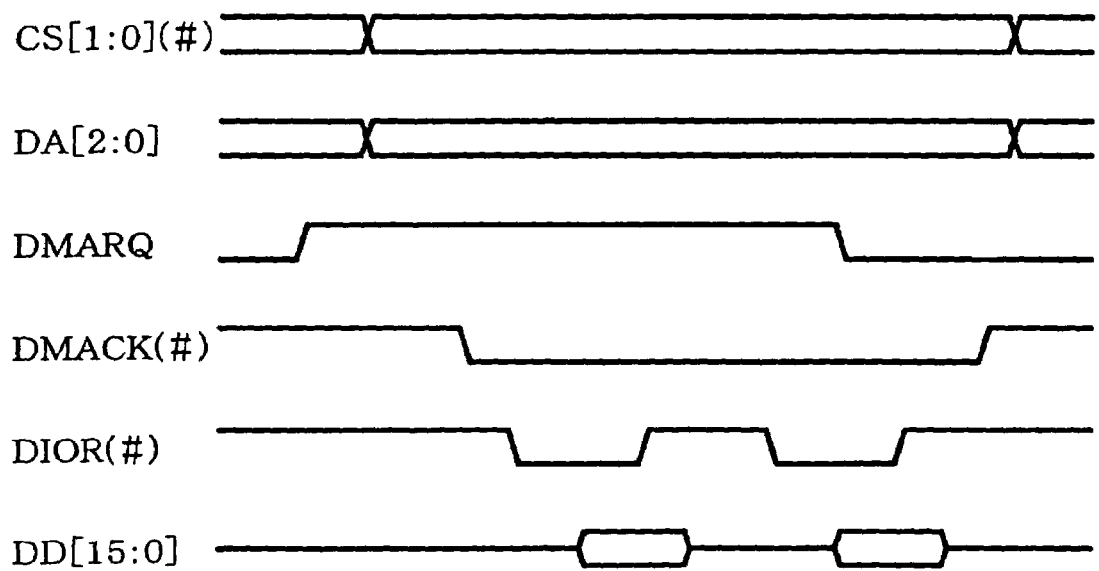
FIGS. 17A and 17B are views showing signal waveform examples during DMA reading and DMA writing.
Figure 17B:
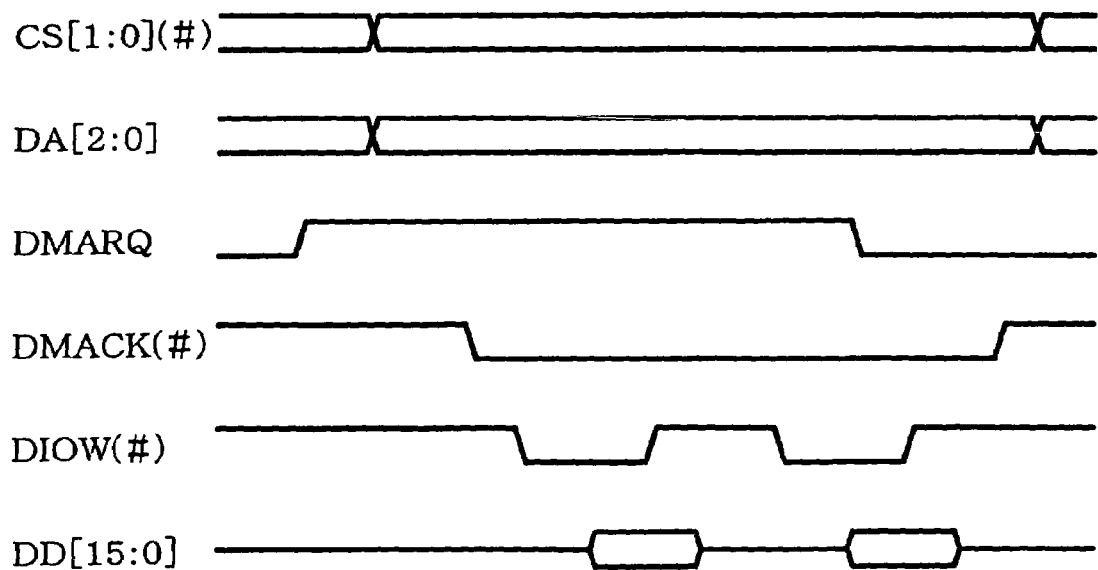

FIGS. 17A and 17B are signal waveform examples during DMA reading and DMA writing. The storage device 100 (interface circuit 102) asserts the signal DMARQ (H level) when preparations for data transfer are completed. The data transfer control system 10 (interface circuit 30) asserts the signal DMACK (L level) in response to the signal DMARQ to start DMA transfer. The DMA transfer of data DD[15:0] is performed by using the signal DIOR (during reading) or DIOW (during writing).

Figure 18A:
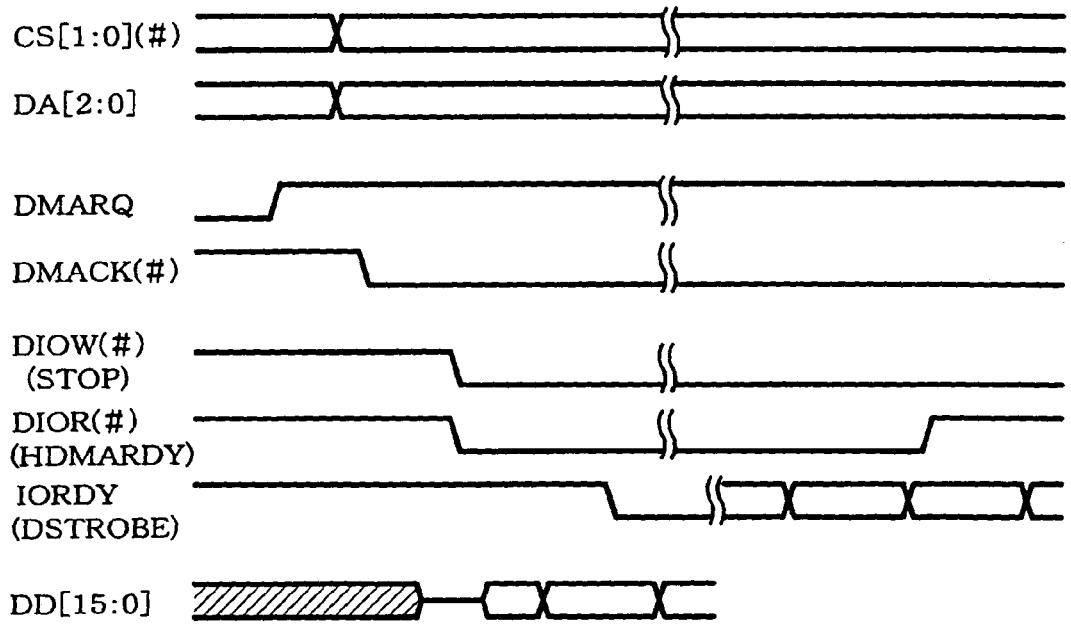
FIGS. 18A and 18B are views showing signal waveform examples during UltraDMA reading and UltraDMA writing.
Figure 18B:
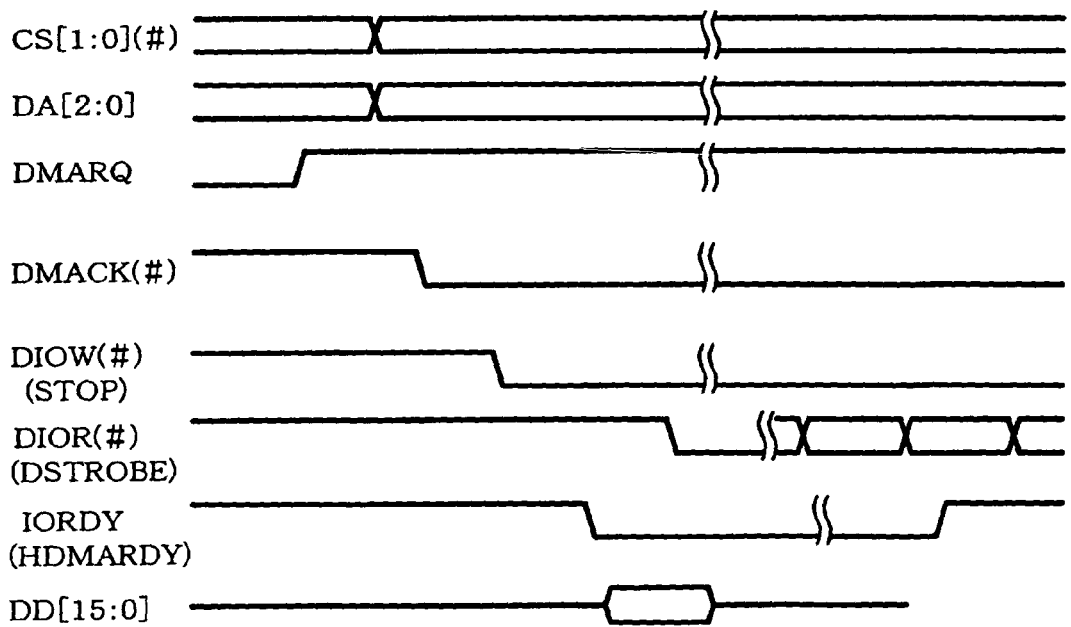

FIGS. 18A and 18B are signal waveform examples during UltraDMA reading and UltraDMA writing. The storage device 100 asserts the signal DMARQ when preparations for data transfer are completed. The data transfer control system 10 asserts the signal DMACK in response to the signal DMARQ to start DMA transfer. The UltraDMA transfer of data DD[15:0] is performed by using the signals DIOW, DIOR, and IORDY.

The present invention is not limited to the present embodiment. Various modifications and variations are possible within the spirit and scope of the present invention.

For example, the terms (IEEE1394, ATA/ATAPI, SBP-2, IPover1394, ORB, personal computer/storage device, hard disk drive/optical disk drive, storage device, CPU, and the like) cited in the description in the specification as the terms in a broad sense (first interface standard, second interface standard, first higher layer protocol of the first interface standard, second higher layer protocol of the first interface standard, command packet, electronic instrument, storage device, device, processor, and the like) may be replaced by the terms in a broad sense in another description in the specification.

Part of requirements of a claim of the present invention could be omitted from a dependent claim which depends on that claim. Moreover, part of requirements of any independent claim of the present invention could be made to depend on any other independent claim.

The configuration of the data transfer control system and the electronic instrument of the present invention is not limited to the configuration shown in FIG. 7. Various modifications and variations are possible. For example, a part of each of the circuit blocks and the functional blocks shown in FIGS. 9 and 18 may be omitted, or the connection relation between the blocks may be modified. The second bus (BUS2) may be connected with a device other than the storage device. The connection configuration of the physical layer circuit, the link layer circuit, and the packet buffer is not limited to the connection configuration shown in FIG. 7.

The present embodiment illustrates the case where the functions of the command processing section, DMA transfer instruction section, and the like are realized by the firmware (program). However, a part or all of the functions of these sections may be realized by hardware.

The present invention may be applied to various types of electronic instruments (hard disk drive, optical disk drive, magneto-optical disc drive, PDA, expansion device, audio equipment, digital video camera, portable telephone, printer, scanner, TV, VTR, telephone, display device, projector, personal computer, electronic notebook, and the like).

The present embodiment illustrates the case where the present invention is applied to data transfer conforming to the IEEE1394, SBP-2, and ATA/ATAPI standards. However, the present invention may be applied to data transfer conforming to standards based on the same idea as IEEE1394 (P1394a), SBP-2 (SBP), and ATA/ATAPI and standards developed from IEEE1394, SBP-2, and ATA/ATAPI.

The specification discloses the following matters about the configuration of the embodiments described above.

One embodiment of the present invention relates to a data transfer control system for transferring data through a bus, comprising:

a command processing section which receives a command packet transferred through a first bus and issues a command included in the command packet to a device connected with a second bus; and a Direct Memory Access (DMA) transfer instruction section which sets a fixed DMA data length irrespective of type of the issued command and instructs start of DMA transfer to or from the device connected with the second bus.

According to this data transfer control system, a command included in the command packet transferred through the first bus is issued to a device connected with the second bus. The fixed DMA data length is set irrespective of the type of the issued command, and the DMA transfer is then started. Therefore, it is unnecessary for the data transfer control system to perform processing for acquiring an appropriate DMA data length corresponding to type of a command, whereby a processing load can be reduced.

In this data transfer control system, the DMA transfer instruction section may abort the started DMA transfer when the device which is connected with the second bus and has received the issued command informs of completion of command processing.

This enables the DMA transfer which has been started after setting a sufficiently long DMA data length to be aborted on condition that the data transfer control system receives a notification of completion of the command processing, whereby the DMA transfer can be completed appropriately.

In this data transfer control system, the DMA transfer instruction section may instruct start of the DMA transfer when the device which is connected with the second bus and has received the issued command requests start of the DMA transfer.

In this data transfer control system, the device connected with the second bus may be a device which writes data transferred through the second bus in a storage or reads data to be transferred through the second bus from the storage, and the DMA transfer instruction section may set a value greater than a storage capacity of the storage as the fixed DMA data length.

In this data transfer control system, the DMA transfer instruction section may set a value greater than a data length which is capable of being designated by a command included in the command packet as the fixed DMA data length.

In this data transfer control system, the command processing section may issue a command included in the command packet to the device connected with the second bus without decoding the command.

This enables decode processing (decode processing for calculating the DMA data length size) of the command to be omitted, whereby a processing load can be reduced.

In this data transfer control system, the first bus may be a bus through which data is transferred according to a first interface standard and the second bus may be a bus through which data is transferred according to a second interface standard, and the command packet may be a packet defined by a higher layer protocol of the first interface standard.

In this data transfer control system, the first bus may be a bus through which data is transferred according to the IEEE 1394 standard and the second bus may be a bus through which data is transferred according to the AT Attachment (ATA)/ATA Packet Interface (ATAPI) standard, and the command packet may be an ORB packet defined by the Serial Bus Protocol-2 (SBP-2).

Another embodiment of the present invention relates to an electronic instrument comprising any of the above data transfer control systems and the device connected with the second bus.

Further embodiment of the present invention relates to a program causing a data transfer control system to function as:

a command processing section which receives a command packet transferred through a first bus and issues a command included in the command packet to a device connected with a second bus; and a Direct Memory Access (DMA) transfer instruction section which sets a fixed DMA data length irrespective of type of the issued command and instructs start of DMA transfer to or from the device connected with the second bus.

Still another embodiment of the present invention relates to a data transfer control method for transferring data through a bus, the method comprising:

receiving a command packet transferred through a first bus and issuing a command included in the command packet to a device connected with a second bus; and setting a fixed Direct Memory Access (DMA) data length irrespective of type of the issued command and instructing start of DMA transfer to or from the device connected with the second bus.

What is claimed is:

1. A data transfer control system for transferring data through a bus, comprising:

a command processing section which receives a command packet transferred through a first bus and issues a command included in the command packet to a device connected with a second bus; and a Direct Memory Access (DMA) transfer instruction section which sets a fixed DMA data length irrespective of type of the issued command and instructs start of DMA transfer to or from the device connected with the second bus, wherein the device connected with the second bus is a device which writes data transferred through the second bus in a storage or reads data to be transferred through the second bus from the storage, and wherein the DMA transfer instruction section sets a value greater than a storage capacity of the storage as the fixed DMA data length.

2. The data transfer control system as defined in claim 1, wherein the DMA transfer instruction section aborts the started DMA transfer when the device which is connected with the second bus and has received the issued command informs of completion of command processing.

3. The data transfer control system as defined in claim 1, wherein the DMA transfer instruction section instructs start of the DMA transfer when the device which is connected with the second bus and has received the issued command requests start of the DMA transfer.

4. The data transfer control system as defined in claim 1, wherein the command processing section issues a command included in the command packet to the device connected with the second bus without decoding the command.

5. The data transfer control system as defined in claim 1, wherein the first bus is a bus through which data is transferred according to a first interface standard and the second bus is a bus through which data is transferred according to a second interface standard, and
wherein the command packet is a packet defined by a higher layer protocol of the first interface standard.

6. An electronic instrument comprising:
the data transfer control system as defined in claim 1; and
the device connected with the second bus.

7. A data transfer control system for transferring data through a bus, comprising:
a command processing section which receives a command packet transferred through a first bus and issues a command included in the command packet to a device connected with a second bus; and
a Direct Memory Access (DMA) transfer instruction section which sets a fixed DMA data length irrespective of type of the issued command and instructs start of DMA transfer to or from the device connected with the second bus,
wherein the DMA transfer instruction section sets a value greater than a data length which is capable of being designated by a command included in the command packet as the fixed DMA data length.

8. A data transfer control system for transferring data through a bus, comprising:
a command processing section which receives a command packet transferred through a first bus and issues a command included in the command packet to a device connected with a second bus; and
a Direct Memory Access (DMA) transfer instruction section which sets a fixed DMA data length irrespective of type of the issued command and instructs start of DMA transfer to or from the device connected with the second bus,
wherein the first bus is a bus through which data is transferred according to the IEEE1394 standard and the second bus is a bus through which data is transferred according to the AT Attachment (ATA)/ATA Packet Interface (ATAPD standard, and
wherein the command packet is an ORB packet defined by the Serial Bus Protocol-2 (SBP-2).

9. A data transfer control method for transferring data through a bus, the method comprising:
receiving a command packet transferred through a first bus and issuing a command included in the command packet to a device connected with a second bus; and
setting a fixed Direct Memory Access (DMA) data length irrespective of type of the issued command and instructing start of DMA transfer to or from the device connected with the second bus,
wherein the device connected with the second bus is a device which writes data transferred through the second bus in a storage or reads data to be transferred through the second bus from the storage, and
wherein the method further comprises setting a value greater than a storage capacity of the storage as the fixed DMA data length.

10. The data transfer control method as defined in claim 9, further comprising:
aborting the started DMA transfer when the device connected with the second bus which has received the issued command informs of completion of command processing.

11. The data transfer control method as defined in claim 9, further comprising:
instructing start of the DMA transfer when the device connected with the second bus which has received the issued command requests start of the DMA transfer.

12. The data transfer control method as defined in claim 9, further comprising:
issuing a command included in the command packet to the device connected with the second bus without decoding the command.

13. The data transfer control method as defined in claim 9,
wherein the first bus transfers data conforming to a first interface standard and the second bus transfers data conforming to a second interface standard, and
wherein the command packet is a packet defined by a higher layer protocol of the first interface standard.

14. A data transfer control method for transferring data through a bus, the method comprising:
receiving a command packet transferred through a first bus and issuing a command included in the command packet to a device connected with a second bus;
setting a fixed Direct Memory Access (DMA) data length irrespective of type of the issued command and instructing start of DMA transfer to or from the device connected with the second bus; and setting a value greater than a data length which is capable of being designated by a command included in the command packet as the fixed DMA data length.

15. A data transfer control method for transferring data through a bus, the method comprising:
receiving a command packet transferred through a first bus and issuing a command included in the command packet to a device connected with a second bus; and
setting a fixed Direct Memory Access (DMA) data length irrespective of type of the issued command and instructing start of DMA transfer to or from the device connected with the second bus,
wherein the first bus transfers data conforming to the IEEE1394 standard and the second bus transfers data conforming to the AT Attachment (ATA)/ATA Packet Interface (ATAPI) standard, and
wherein the command packet is an operation request block (ORB) packet defined by the Serial Bus Protocol-2 (SBP-2).

16. A data transfer control system for transferring data through a bus, comprising:
a command processing section which receives a command packet transferred through a first bus and issues a command included in the command packet to a device connected with a second bus; and a Direct Memory Access (DMA) transfer instruction section which sets a fixed DMA data length irrespective of type of the issued command and instructs start of DMA transfer to or from the device connected with the second bus, wherein the command processing section omits decode processing of a command for calculating a size of a DMA data length and issues the command to the device connected with the second bus, the command being included in the command packet which is transferred through the first bus, wherein the first bus is a bus through which data is transferred according to the IEEE1394 standard and the second bus is a bus through which data is transferred according to the AT Attachment (ATA)/ATA Packet Interface (ATAPI) standard, and wherein the command packet is an ORB packet defined by the Serial Bus Protocol-2 (SBP-2).

17. The data transfer control system as defined in claim 16, wherein the DMA transfer instruction section aborts the started DMA transfer when the device which is connected with the second bus and has received the issued command informs of completion of command processing.

18. The data transfer control system as defined in claim 16, wherein the first bus is a bus through which data is transferred according to a first interface standard and the second bus is a bus through which data is transferred according to a second interface standard, and wherein the command packet is a packet defined by a higher layer protocol of the first interface standard.

19. A data transfer control method for transferring data through a bus, the method comprising:

receiving a command packet transferred through a first bus and issuing a command included in the command packet to a device connected with a second bus;

setting a fixed Direct Memory Access (DMA) data length irrespective of type of the issued command and instructing start of DMA transfer to or from the device connected with the second bus; and omitting decode processing of a command for calculating a sizes of a DMA data length and issuing the command to the device connected with the second bus, the command being included in the command packet which is transferred through the first bus, wherein the first bus transfers data conforming to the IEEE1394 standard and the second bus transfers data conforming to the AT Attachment (ATA)/ATA Packet Interface (ATAPI) standard, and wherein the command packet is an operation recluest block (ORB) packet defined by the Serial Bus Protocol-2 (SBP-2).

20. The data transfer control method as defined in claim 19, further comprising:

aborting the started DMA transfer when the device connected with the second bus which has received the issued command informs of completion of command processing.

21. The data transfer control method as defined in claim 19, wherein the first bus transfers data conforming to a first interface standard and the second bus transfers data conforming to a second interface standard, and wherein the command packet is a packet defined by a higher layer protocol of the first interface standard.

* * * * *